United States Patent
Ishikawa et al.

(10) Patent No.: US 9,606,426 B2
(45) Date of Patent: Mar. 28, 2017

(54) DUCT COVER FOR AN IMAGE PROJECTION APPARATUS

(71) Applicants: Naoyuki Ishikawa, Kanagawa (JP); Tetsuya Fujioka, Kanagawa (JP); Hideo Kanai, Tokyo (JP); Akihisa Mikawa, Kanagawa (JP); Masamichi Yamada, Kanagawa (JP); Yasunari Mikutsu, Tokyo (JP); Satoshi Tsuchiya, Kanagawa (JP); Yukimi Nishi, Tokyo (JP)

(72) Inventors: Naoyuki Ishikawa, Kanagawa (JP); Tetsuya Fujioka, Kanagawa (JP); Hideo Kanai, Tokyo (JP); Akihisa Mikawa, Kanagawa (JP); Masamichi Yamada, Kanagawa (JP); Yasunari Mikutsu, Tokyo (JP); Satoshi Tsuchiya, Kanagawa (JP); Yukimi Nishi, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/453,870

(22) Filed: Aug. 7, 2014

(65) Prior Publication Data
US 2015/0049311 A1    Feb. 19, 2015

(30) Foreign Application Priority Data
Aug. 13, 2013    (JP) .................................. 2013-168231

(51) Int. Cl.
*G03B 21/16* (2006.01)
*H04N 9/31* (2006.01)
(Continued)

(52) U.S. Cl.
CPC ........... *G03B 21/16* (2013.01); *G03B 21/145* (2013.01); *G03B 21/2093* (2013.01); *H04N 9/3144* (2013.01)

(58) Field of Classification Search
CPC .. G03B 21/16; G03B 21/145; G03B 21/2093; H04N 9/3144
See application file for complete search history.

(56) References Cited

U.S. PATENT DOCUMENTS 7,086,740 B2 *   8/2006   Sample .................. G03B 21/16
                                                   348/748
7,594,846 B2 *   9/2009   Sample .................. G03B 21/16
                                                   454/184
(Continued)

FOREIGN PATENT DOCUMENTS

JP    2004109781 A    4/2004
JP    2007-163685     6/2007
(Continued)

OTHER PUBLICATIONS

Japanese Office Action mailed Jul. 25, 2014.

*Primary Examiner* — Bao-Luan Le
(74) *Attorney, Agent, or Firm* — Harness, Dickey & Pierce, P.L.C.

(57) ABSTRACT

An image projection apparatus includes: a grid portion provided on a housing of the apparatus and having a plurality of grids through which air flows in or out of the apparatus. The grid portion includes an edge portion of the grid portion, and a central portion of the grid portion, having a thickness thicker than a thickness of the edge portion of the grid portion.

16 Claims, 24 Drawing Sheets

(51) Int. Cl.
*G03B 21/20* (2006.01)
*G03B 21/14* (2006.01)

(56) References Cited

U.S. PATENT DOCUMENTS

| | | | | |
|---|---|---|---|---|
| 7,726,817 | B2* | 6/2010 | Suzuki | G03B 21/16 353/119 |
| 8,529,656 | B2* | 9/2013 | Hashiba | G03B 21/16 353/52 |
| 9,028,076 | B2* | 5/2015 | Nishima | G03B 21/16 353/119 |
| 2001/0037732 | A1* | 11/2001 | Pillion | B01D 46/0043 96/424 |
| 2005/0001988 | A1* | 1/2005 | Sample | G03B 21/16 353/52 |
| 2005/0140935 | A1* | 6/2005 | Shin | G03B 21/00 353/52 |
| 2006/0192926 | A1* | 8/2006 | Soper | G03B 21/006 353/119 |
| 2007/0002289 | A1* | 1/2007 | Oh | F16M 11/12 353/119 |
| 2007/0229773 | A1* | 10/2007 | Suzuki | G03B 21/16 353/52 |
| 2008/0049193 | A1* | 2/2008 | Zheng et al. | 353/57 |
| 2009/059181 | A1* | 3/2009 | Loomis et al. | 353/61 |
| 2012/0047857 | A1* | 3/2012 | Hashiba | G03B 21/16 55/385.4 |
| 2013/0010268 | A1* | 1/2013 | Nishima | G03B 21/16 353/52 |
| 2013/0128234 | A1 | 5/2013 | Fujioka et al. | |
| 2013/0249959 | A1* | 9/2013 | Umehara | H04N 7/142 345/690 |

FOREIGN PATENT DOCUMENTS

| | | |
|---|---|---|
| JP | 2010-020344 | 1/2010 |
| JP | 2010-138845 | 6/2010 |
| JP | 2011-150014 | 8/2011 |

* cited by examiner

DUCT COVER FOR AN IMAGE PROJECTION APPARATUS

CROSS-REFERENCE TO RELATED APPLICATIONS

This patent application is based on and claims priority pursuant to 35 U.S.C. §119(a) to Japanese Patent Application No. 2013-168231, filed on Aug. 13, 2013, in the Japan Patent Office, the entire disclosure of which is hereby incorporated by reference herein.

BACKGROUND

Technical Field

The present invention relates to an image projection apparatus such as a projector.

Description of the Related Art

The image projection apparatuses form an image based on image data received from a personal computer, a video camera or the like, using light emitted from a light source, and project the image on a screen or the like.

The image projection apparatuses further take the air outside the apparatus from an intake duct of the housing to which a grid-like cover member as a grid portion is attached, and cools a heat source such as a light source or a power supply inside the apparatus.

SUMMARY

Example embodiments of the present invention include an image projection apparatus including: a grid portion provided on a housing of the apparatus and having a plurality of grids through which air flows in or out of the apparatus. The grid portion includes an edge portion of the grid portion, and a central portion of the grid portion, having a thickness thicker than a thickness of the edge portion of the grid portion.

DETAILED DESCRIPTION

Hereinafter, an embodiment of the present invention will be described with reference to the drawings.

First, an overall configuration of the image projection apparatus, which may be provided with a light receiving device, will be described according to an embodiment of the present invention.

Figure 1:
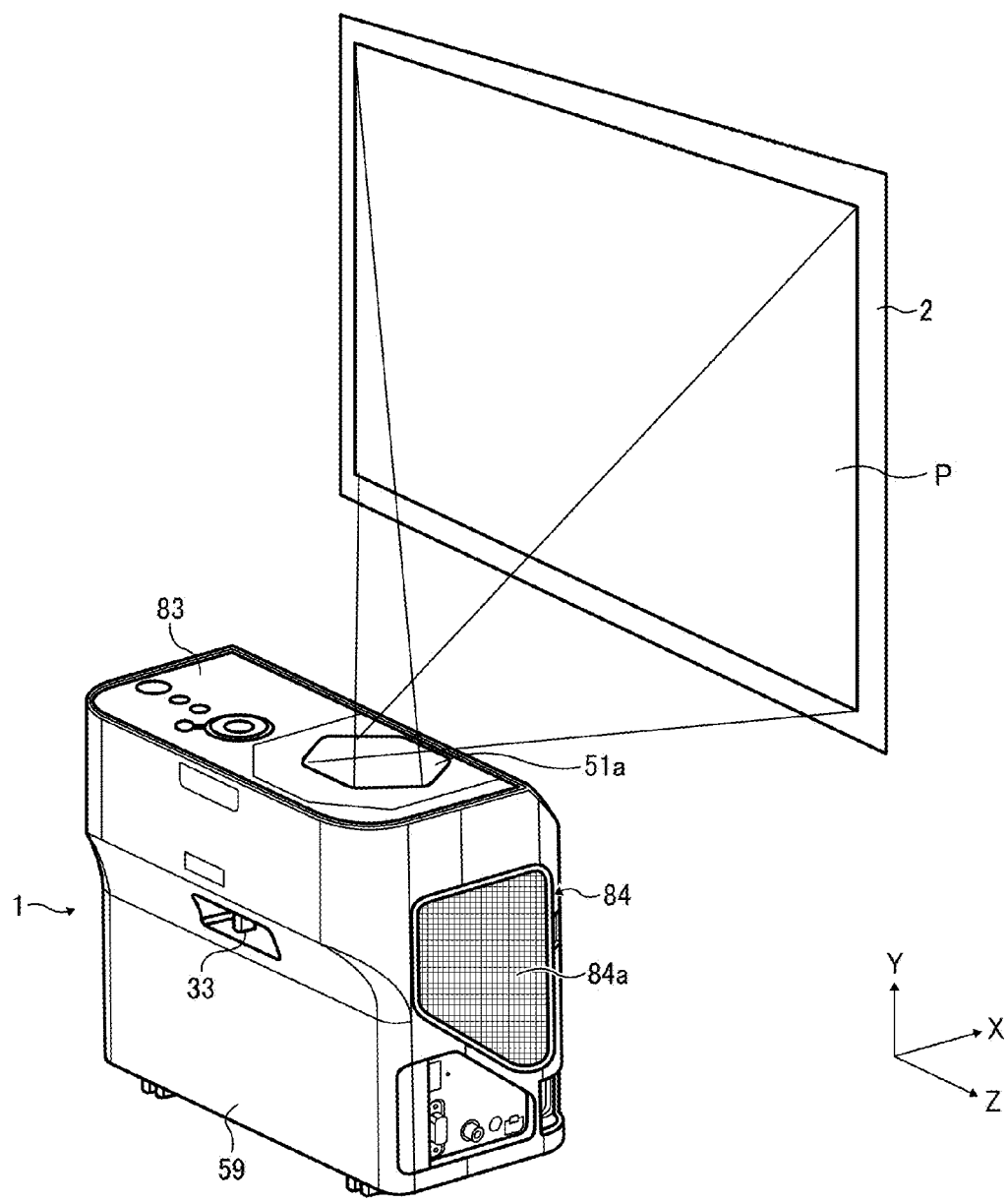
FIG. 1 is a perspective view illustrating a projector and a projection plane according to an embodiment of the present invention.

FIG. 1 is an external perspective view illustrating a projector 1 as an image projection apparatus according to an embodiment of the present invention, and a projection plane 2 such as a screen. In the following description, as illustrated in FIG. 1, a normal direction of the projection plane 2 is defined as an X-direction, a direction (a vertical direction) of a minor axis of the projection plane is defined as a Y-direction, and a direction (a horizontal direction) of a major axis of the projection plane 2 is defined as a Z-direction.

The projector 1 is an apparatus that forms a projection image based on image data input from a personal computer, a video camera or the like, and projects the projection image P on the projection plane 2 such as a screen. In a liquid crystal projector, recently, an improvement in brightness, a cost reduction and the like accompanied by high resolution of the liquid crystal panel, and high efficiency of the light source (lamp) have been in progress. Furthermore, a small light projector using a digital micro-mirror device (DMD) as a micro drive mirror device is in widespread use, and the projector has come to be widely used even in homes as well as in offices and schools. Furthermore, a front-type projector has improved in portability and has come to be used even in small meeting of several people. In such a projector, there have been requests for enabling the projection of the image of a large screen (increase in screen size of the projection plane) and enabling the reduction of "projection space required other than the projector" as much as possible. As will be described below, the projector 1 of the present embodiment is configured so that a transparent optical system such as a projection lens is set in parallel to the projection plane 2, and after reflecting the optical flux at a reflecting mirror, the optical flux expands and reflects with respect to the projection plane 2 by a free-form surface mirror. With this configuration, an upright optical engine can be downsized.

A dust-proof glass 51 is mounted on the upper surface of the projector 1. The optical flux passing through the dust-proof glass 51 is projected onto the projection plane 2 to form the projection image P on the projection plane 2. In addition, an operation unit 83 for allowing a user to operate the projector 1 is provided on the upper surface of the projector 1. Furthermore, a focus lever 33 for adjusting the focus is provided on the side surface of the projector 1.

Figure 2A:
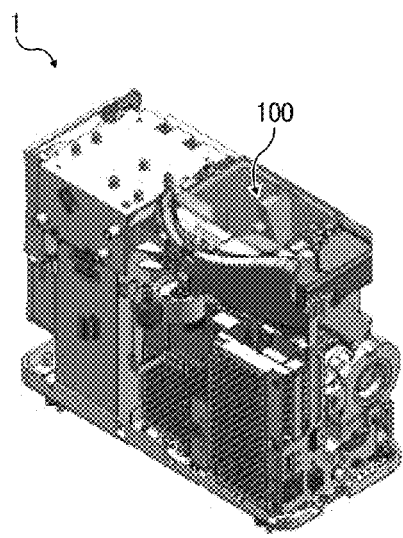
FIG. 2A is a perspective view of the interior of the projector according to an embodiment of the present invention as viewed from the front side of FIG. 1
Figure 2B:
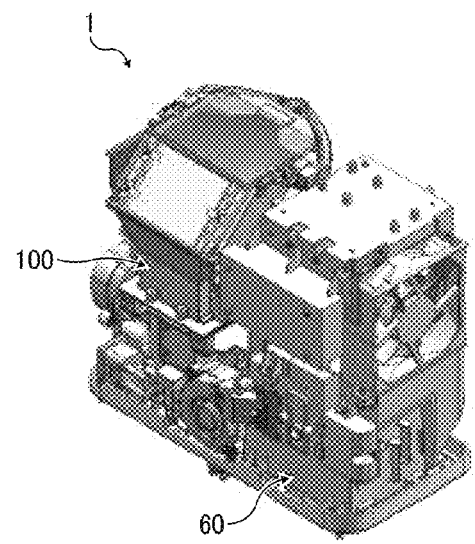
FIG. 2B is a perspective view of the interior of the projector according to an embodiment of the present invention as viewed from the back side of FIG. 1.
Figure 3:
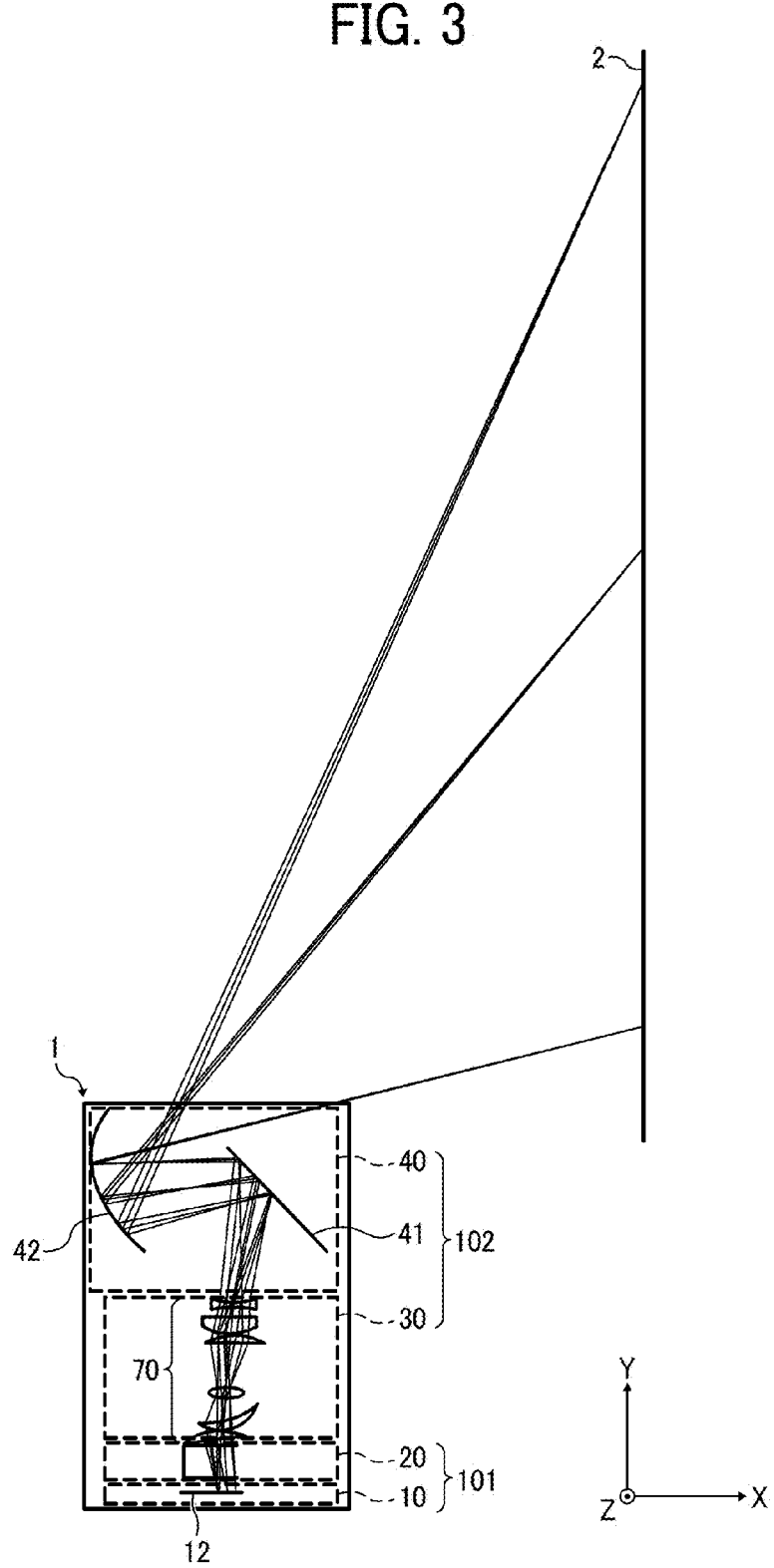
FIG. 3 is an optical path diagram from the projector to the projection plane according to an embodiment of the present invention.

FIGS. 2A and 2B are a perspective view illustrating the interior of the projector 1 with a main body cover of the projector 1 removed. FIG. 2A is a perspective view of the interior of the projector 1 as viewed from the front side of FIG. 1, and FIG. 2B is a perspective view of the interior of the projector 1 as viewed from the back side of FIG. 1. Furthermore, FIG. 3 is a view of an optical path from the projector 1 to the projection plane 2.

The projector 1 is provided with an optical engine 100, and a light source unit 60 having a light source that emits white light. The optical engine 100 is provided with an image forming unit 101 that forms an image using the light from the light source, and a projection optical system 102 for projecting the optical flux of the image formed by the image forming unit 101 onto the projection plane 2.

The image forming unit 101 (FIG. 3) includes a light modulator 10, and an illumination unit 20. The light modulator 10 has a DMD 12 serving as a micro drive mirror device that has a number of micro mirrors capable of driving to vary the slope of the reflection surface. The illumination unit 20 reflects the light from the light source to the DMD 12 with light. The projection optical system 102 includes a first projection optical system 30, a curved mirror 42, and a second projection optical system 40. The first projection optical system 30 includes at least one refractive optical system of a transmission type and is provided with a coaxial optical system 70 having positive power. The second projection optical system 40 has a reflecting mirror 41, and a curved mirror 42 having the positive power.

Light from the light source is irradiated by the illumination unit 20, and by modulating the light irradiated by the illumination unit 20, an image is generated on the DMD 12. The light image generated by the DMD 12 is projected onto the projection plane 2 via the optical system 70 of the first projection optical system 30, the reflecting mirror 41 and the curved mirror 42 of the second projection optical system 40.

Figure 4:
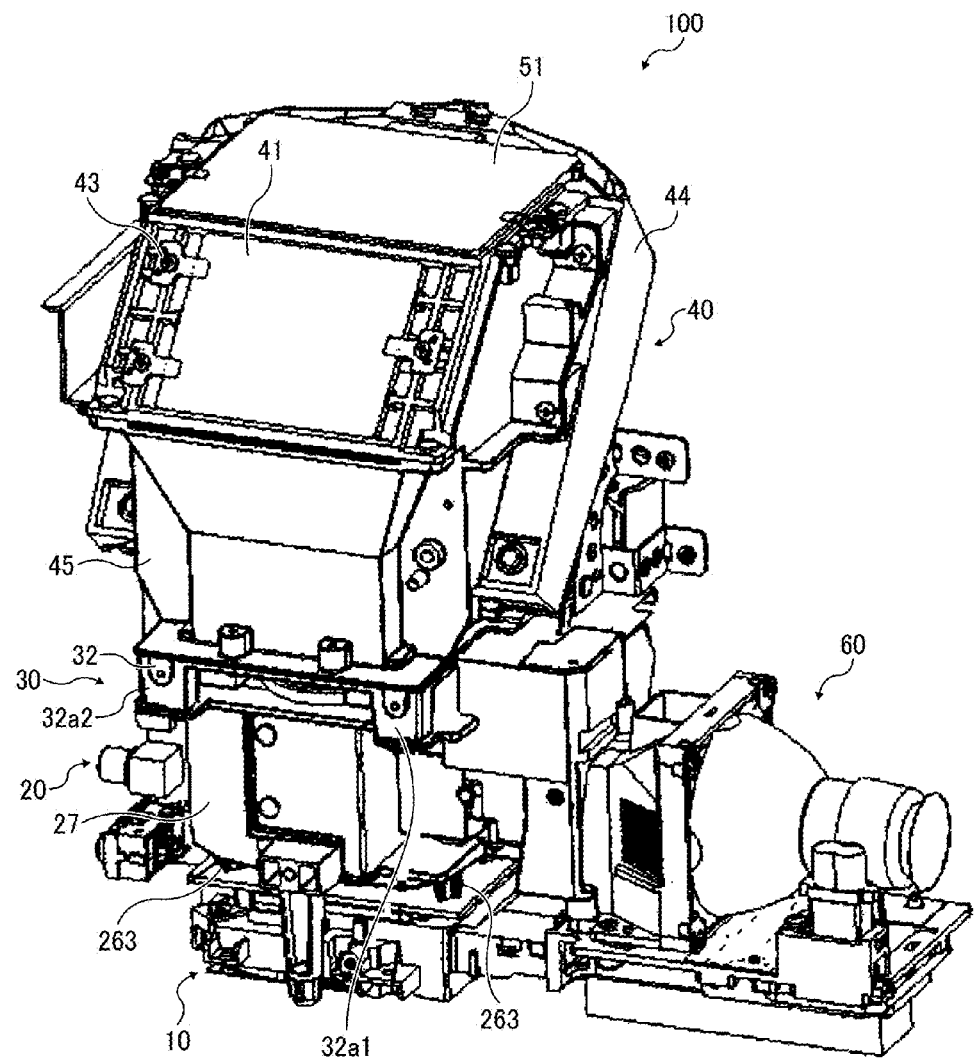
FIG. 4 is a schematic perspective view illustrating an internal configuration of the projector according to an embodiment of the present invention.

FIG. 4 is a perspective view of the optical engine 100 and the light source unit 60 provided inside the projector 1.

As illustrated in FIG. 4, the light modulator 10, the illumination unit 20, the first projection optical system 30, and the second projection optical system 40, collectively forming the optical engine 100 are arranged in parallel to the Y-direction of FIG. 4 of the direction parallel to the projection plane 2 and the image plane of the projection image P. Furthermore, the light source unit 60 is disposed on the right side of the illumination unit 20 in FIG. 4. Furthermore, reference numerals 32a1 and 32a2 illustrated in FIG. 4 indicate legs of a lens holder 32 of the first projection optical system 30, and reference numeral 263 indicates a screw unit for screwing the light modulator 10 into the illumination unit 20.

Figure 5:
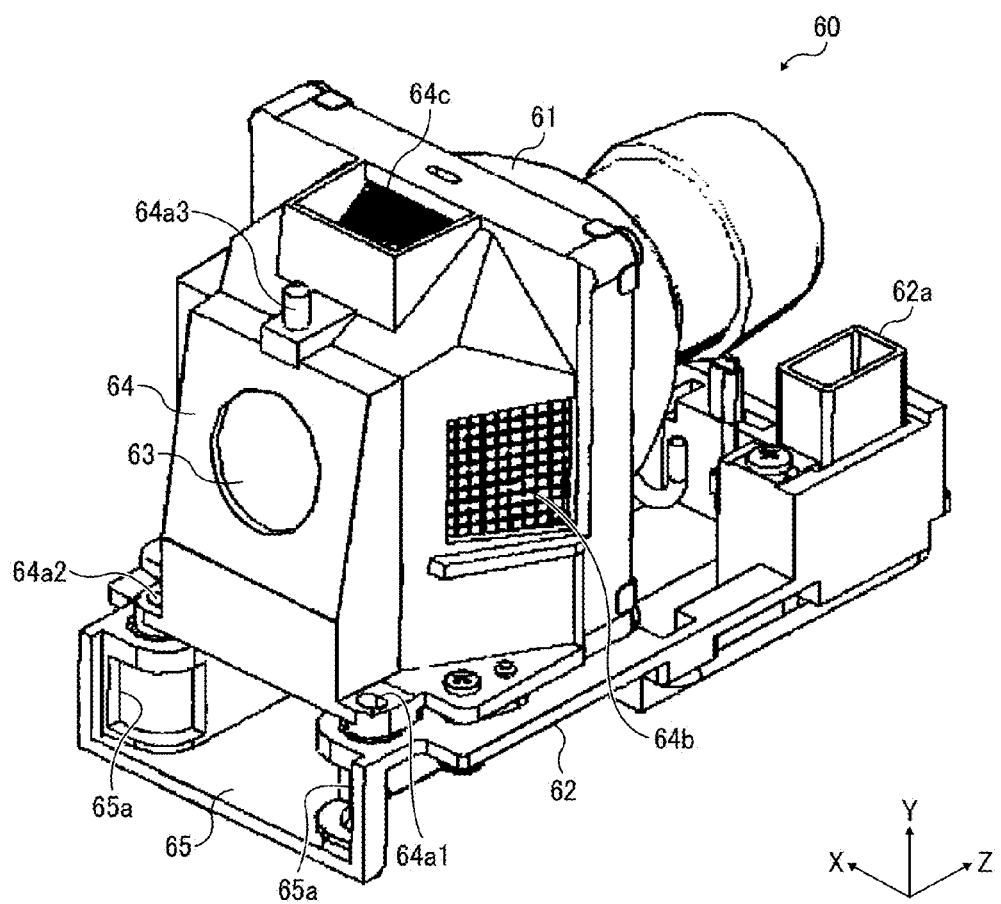
FIG. 5 is a schematic perspective view of a light source unit according to an embodiment of the present invention.

FIG. 5 is a schematic perspective view of the light source unit 60.

The light source unit 60 has a light source bracket 62, and a light source 61 such as a halogen lamp, a metal halide lamp, and a high-pressure mercury lamp is mounted on the upper part of the light source bracket 62. The light source bracket 62 is provided with a connector 62a to connect to a power supply connector connected to a power supply unit (not illustrated). The connector 62a is provided on one end side in a longitudinal direction (Z-direction) of the light source unit 60.

Furthermore, on the light emitting side of the light source 61 at the top of the light source bracket 62 (the other end side in the longitudinal direction of the light source unit 60), a holder 64 as a holding member on which a reflector (not illustrated) is held is screwed. On the surface of the holder 64 on the opposite side to the arrangement side of the light source 61, an emission window 63 is provided. Light emitted from the light source 61 is focused on the emission window 63 by a reflector (not illustrated) held by the holder 64, and is emitted from the emission window 63.

Furthermore, on the upper surface of the holder 64, and at both ends in the X-direction of the lower surface of the holder 64, light source positioning units 64a1, 64a2, and 64a3 for positioning the light source unit 60 at the lighting bracket 26 (see FIG. 6) of the illumination unit 20 are provided. The two light source positioning units 64a1 and 64a2 provided on the lower surface of the holder 64 are formed as holes. The light source positioning unit 64a3 provided on the upper surface of the holder 64 is formed as a projection.

Furthermore, on the side surface of the holder 64, a light source air supply port 64b into which air for cooling the light source 61 flows is provided, and on the upper surface of the holder 64, a light source exhaust duct 64c through which the air heated by heat of the light source 61 is exhausted is provided.

The light source bracket 62 is provided with a handle 68 in which a user picks the handle with his fingers to extract the light source unit 60 at the time of replacement of the light source unit 60. The handle 68 is rotatably attached to the light source bracket 62 at the substantially center of the connector 62a and the light source positioning units 64a1 and 64a2 in the longitudinal direction of the light source bracket 62 (Z-direction in the drawings). The handle 68 may also have an appropriate shape to the extent that a user picks the handle with finger leading ends, in addition to the illustrated shape.

Figure 6:
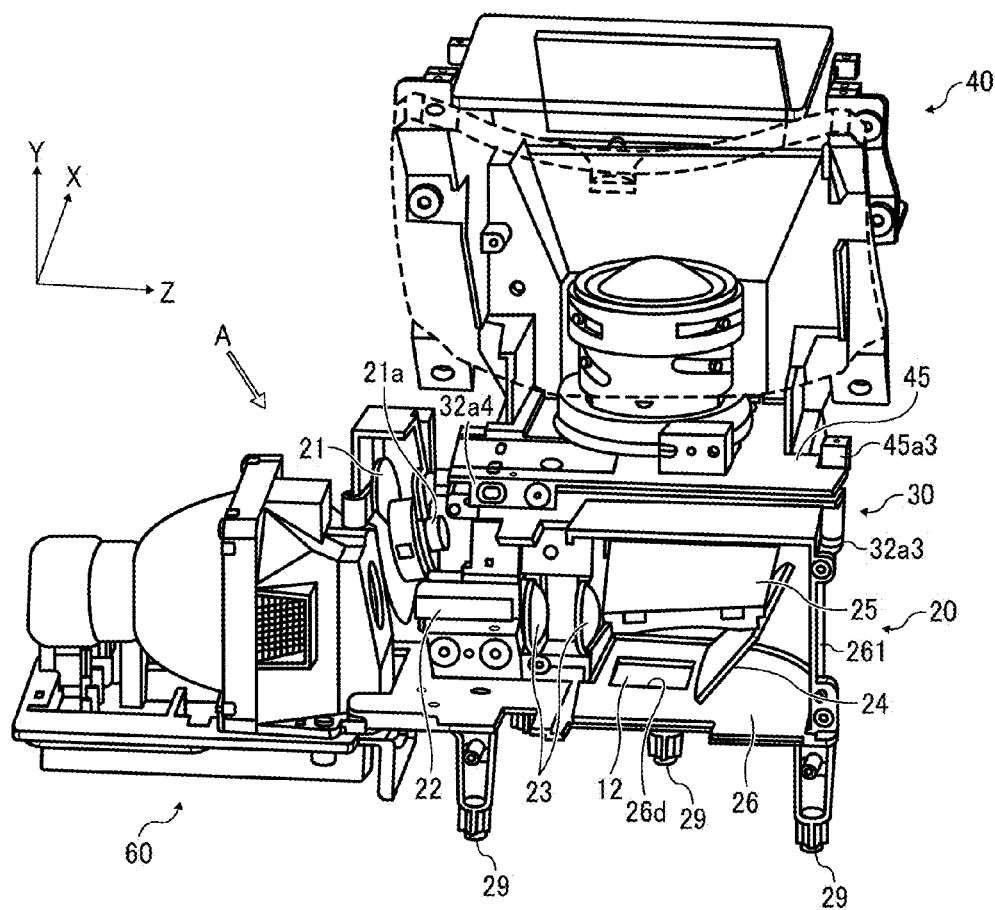
FIG. 6 is a perspective view illustrating optical system components stored in an illumination unit together with other units according to an embodiment of the present invention.

FIG. 6 is a perspective view of the illumination unit 20 which illustrates the optical system components stored in the illumination unit 20 along with other components.

Figure 7:
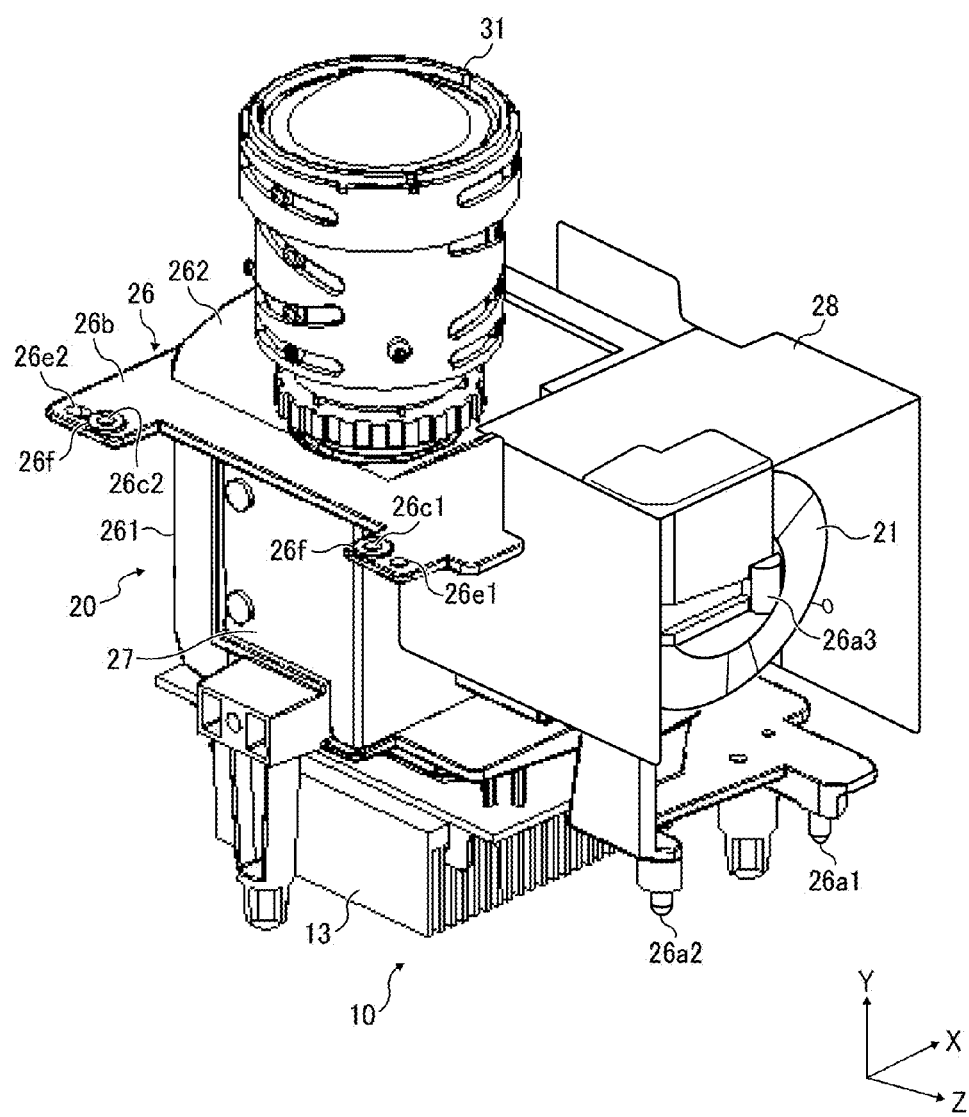
FIG. 7 is a perspective view of the illumination unit, a projection lens, and an image forming unit according to an embodiment of the present invention as viewed from a direction A of FIG. 6.

As illustrated in FIG. 7, the illumination unit 20 has a color wheel 21, a light tunnel 22, two sheets of relay lenses 23, a cylindrical mirror 24, and a concave mirror 25. These components are held in the lighting bracket 26. The lighting bracket 26 has a box-shaped portion 261 in which two sheets of relay lenses 23, the cylindrical mirror 24, and the concave mirror 25 are housed. Among four side surfaces of the box-shaped portion 261, only a right side of the drawings has a side surface, and other three surfaces have an opened shape. Moreover, an OFF light plate 27 (see FIG. 8) is attached to the side surface opening of the back side in the X-direction in the drawings, and a cover member (not illustrated) is attached to the side surface opening of the front side in the X-direction of the drawings. Thus, the two sheets of relay lenses 23, the cylindrical mirror 24, and the concave mirror 25 housed in the box-shaped portion 261 of the lighting bracket 26 are covered by the lighting bracket 26, the OFF light plate 27, and a cover member.

Furthermore, on the lower surface of the box-shaped portion 261 of the lighting bracket 26, an irradiating through-hole 26d through which the DMD 12 is exposed is formed.

In addition, the lighting bracket 26 has three legs 29. The legs 29 support the weight of the first projection optical system 30 and the second projection optical system 40 fixed by stacking on the lighting bracket 26, while coming into contact with a base member 53 (see FIG. 13) of the projector 1. Furthermore, by providing the legs 29, a space for allowing outdoor air to flow in is formed in a heat sink 13 (see FIG. 8) as a cooling unit for cooling the DMD 12 of the light modulator 10.

In addition, reference numerals 32a3 and 32a4 illustrated in FIG. 6 are the legs of the lens holder 32 of the first projection optical system 30, and reference numeral 45a3 is a screw unit 45a3 of the second projection optical system 40.

FIG. 7 is a perspective view of the illumination unit 20, a projection lens 31, and the light modulator 10 as viewed from a direction A in FIG. 6.

An upper surface 26b orthogonal to the Y-direction in FIG. 7 is provided above the box-shaped portion 261 of the lighting bracket 26. At four corners of the upper surface 26b, through-holes are provided through which screws for screwing the first projection optical system 30 is inserted (In FIG. 7, the through-holes 26c1 and 26c2 are illustrated, and the remaining through-holes are not illustrated). Furthermore, positioning holes 26e1 and 26e2 for positioning the first projection optical system 30 in the illumination unit 20 are provided near the through-holes 26c1 and 26c2 on the front side in the X-direction of FIG. 7. In the two positioning holes provided on the front side in the X-direction of FIG. 7, the positioning hole 26e1 disposed on the color wheel 21 side is a major positioning reference and has a round hole shape. The positioning holes 26e2 disposed on an opposite side to the arrangement side of the color wheel 21 is a secondary positioning reference, and has a long hole extending in the Z-direction. Furthermore, the periphery of each of the through-holes 26c1 and 26c2 protrudes from the upper surface 26b of the lighting bracket 26, and has a positioning protrusion 26f for positioning the first projection optical system 30 in the Y-direction. If the positional accuracy in the Y-direction were to improve without providing the positioning protrusion 26f, it becomes necessary to increase the flatness of the entire upper surface of the lighting bracket 26, thus increasing the manufacturing cost. In contrary, with the positioning protrusion 26f, since the flatness may be increased only in the portion of the positioning protrusion 26f, the cost is reduced while enhancing the positional accuracy in the Y-direction.

Furthermore, a light shielding plate 262 to which a lower portion of the projection lens 31 is fitted is provided in the opening portion of the upper surface of the lighting bracket 26, thereby preventing light from entering the box-shaped portion 261 from the upper part.

Furthermore, as will be described below, the portion between the through-holes 26c1 and 26c2 of the upper surface 26b of the lighting bracket 26 is cut to avoid interference when the second projection optical system 40 is screwed into the first projection optical system 30.

At the side end of the color wheel 21 of the lighting bracket 26 (a front side in the Z-direction in FIG. 7), a cylindrical light source positioning target unit 26a3 vertically formed with the through-holes is provided, and a protruding light source positioning unit 64a3 (see FIG. 5) provided on the upper surface of the holder 64 of the light source unit 60 described above is fitted to the through-holes. Furthermore, two protruding light source positioning target units 26a1 and 26a2 to which two hole-shaped light source positioning units 64a1 and 64a2 provided on the light source bracket 62 side of the holder 64 are fitted are provided below the light source positioning target unit 26a3. Moreover, the three light source positioning units 64a1 to 64a3 of the holder 64 are fitted to the light source positioning target units 26a1 to 26a3 of three positions provided in the lighting bracket 26 of the illumination unit 20, and thus, the light source unit 60 is positioned and fixed to the illumination unit 20 (see FIG. 4).

Furthermore, an illumination cover 28 that covers the color wheel 21 and the light tunnel 22 is attached to the lighting bracket 26.

Figure 8:
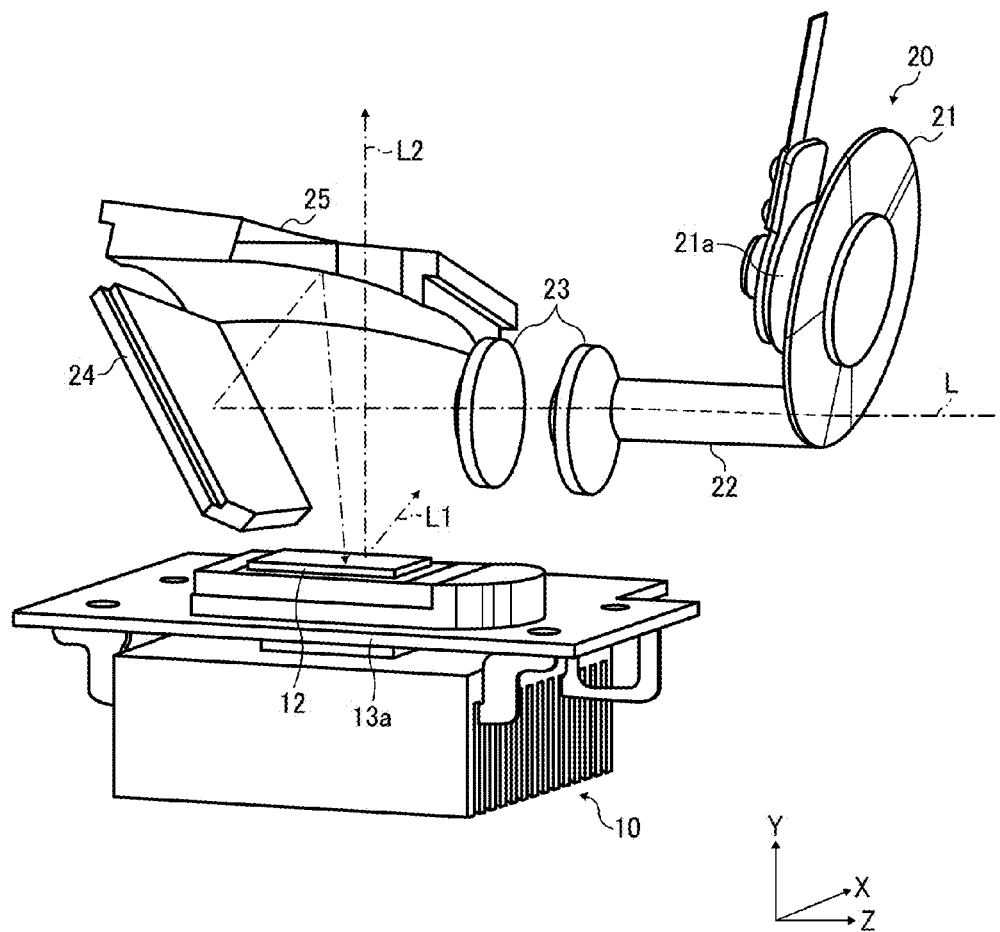
FIG. 8 is a diagram illustrating an optical path of light in the illumination unit according to an embodiment of the present invention.

FIG. 8 is an explanatory view illustrating an optical path of light L in the illumination unit 20.

The color wheel 21, having a disk shape, is fixed to the motor shaft of the color motor 21a. In the color wheel 21, filters of R (red), G (green), B (blue) and the like are provided in a rotational direction. Light collected by a reflector provided on the holder 64 of the light source unit 60 reaches the peripheral edge of the color wheel 21 through the emission window 63. Light reaching the peripheral edge of the color wheel 21 is divided into light of R, G, and B in the time division by the rotation of the color wheel 21.

Light divided by the color wheel 21 is incident on the light tunnel 22. The light tunnel 22 has a rectangular box shape, and an inner peripheral surface thereof is a mirror surface. Light incident on the light tunnel 22 becomes a uniform surface light source and is emitted toward the relay lens 23, while being reflected by the inner peripheral surface of the light tunnel 22 several times.

Light passed through the light tunnel 22 transmits through two relay lenses 23, is reflected by the cylindrical mirror 24 and the concave mirror 25, and is focused on an image generation surface of the DMD 12 to form the image.

Figure 9:
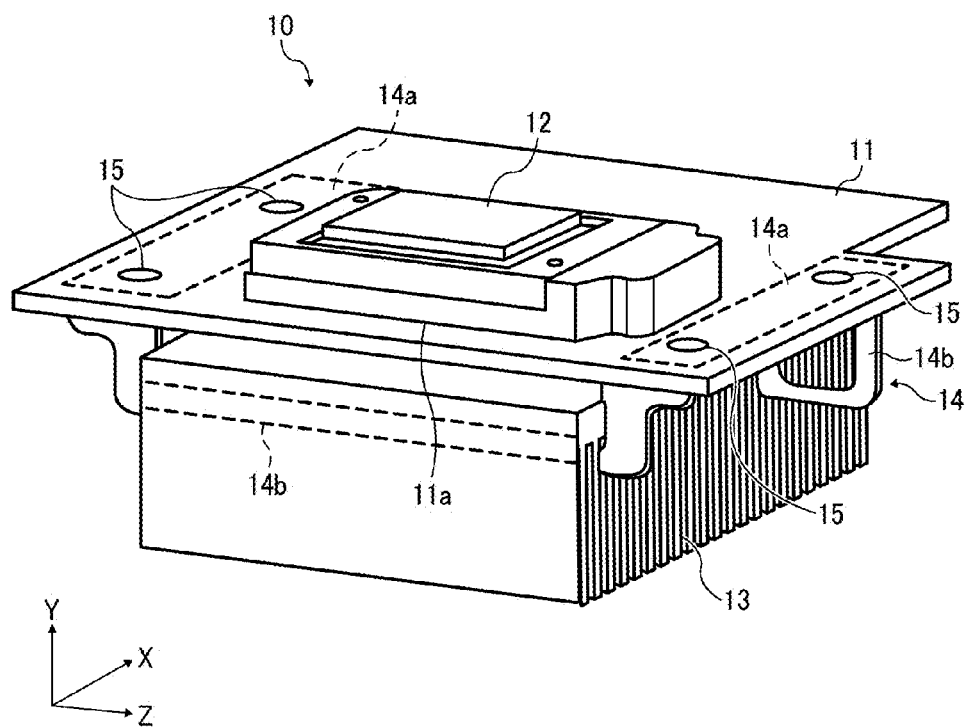
FIG. 9 is a perspective view of the image forming unit according to an embodiment of the present invention.

FIG. 9 is a perspective view of the light modulator 10.

As illustrated in FIG. 9, the light modulator 10 is provided with a DMD board 11 on which the DMD 12 is mounted. The DMD 12 is mounted on a socket 11a provided in the DMD board 11, while causing the image generation surface in which the micro mirrors are arranged in a grid shape to face upward. In the DMD board 11, a drive circuit for driving the DMD mirrors is provided. On the rear surface of the DMD board 11, (surface on an opposite side to the surface on which the socket 11a is provided), the heat sink 13 as a light modulation element cooling unit for cooling the DMD 12 is provided. Through-holes (not illustrated) pass through the position of the DMD board 11 at which the MID 12 is mounted. Projections 13a (not illustrated) to be inserted into the through-holes are formed in the heat sink 13. A leading end of the projection 13a has a flat shape. The projections 13a are inserted into the through-holes (not illustrated) to bring the planes of the leading ends of the projections 13a into contact with the rear surface (surface of an opposite side to the image generation surface) of the DMD 12. An elastically deformable heat transfer sheet may be adhered to the plane and the position at which the heat sink 13 comes into contact with the rear surface of the DMD 12, thereby enhancing the adhesion between the plane of the projection 13a and the rear surface of the DMD 12, and enhancing thermal conductivity.

The heat sink 13 is pressed against and fixed to the surface on an opposite side to the surface of the DMD board 11 on which the socket 11a is provided, by the fixing member 14. The fixing member 14 has a plate-like fixing portion 14a facing a portion of a right side of FIG. 9 of the rear surface of the DMD board 11, and a plate-like fixing portion 14a facing a portion of a left side of FIG. 9 of the rear surface of the DMD board 11. A pressing portion 14b provided so as to connect the left and right fixing portions is provided near one end and the other end in the X-direction of the respective fixing portions.

When screwing the light modulator 10 into the lighting bracket 26 (see FIG. 7), the heat sink 13 is pressed against and fixed to the surface on an opposite side to the surface of the DMD board 11 on which the socket 11a is provided, by the fixing member 14.

Hereinafter, the operation of fixing the lighting bracket 26 of the light modulator 10 will be described. First, the light modulator 10 is positioned at the lighting bracket 26 so that the DMD 12 faces the opening surface of the irradiating through-hole 26d provided on the lower surface of the lighting bracket 26 of the illumination unit 20 illustrated in FIG. 6. Next, the screw is inserted from the lower side of FIG. 6 so as to pass through a through-hole (not illustrated) provided on the fixing portion 14a and the through-hole 15 of the DMD board 11. Moreover, by screwing the screw into the screw hole provided on the lower surface of a screw stopper 263 (see FIG. 4) provided in the lighting bracket 26, the light modulator 10 is fixed to the lighting bracket 26. Furthermore, when screwing the screw to the screw stopper 263 provided in the lighting bracket 26, the pressing portion 14b presses the heat sink 13 against the DMD board side. Thus, the heat sink 13 is pressed against and fixed to the surface of an opposite side to the surface of the DMD board 11 on which the socket 11a is provided, by the fixing member 14.

In this way, the light modulator 10 is fixed to the lighting bracket 26, and three legs 29 illustrated in FIG. 6 also support the weight of the light modulator 10.

On the image generation surface of the DMD 12, a plurality of movable micro mirrors is arranged in a grid shape. Each micro mirror is able to slope the mirror surface around a torsion axis at a predetermined angle and is able to have two states of "ON" and "OFF". When the micro mirror is in the state of "ON", as illustrated by an arrow L2 in FIG. 8, the micro mirror reflects light from the light source 61 toward the first optical system 70 (see FIG. 3). When the micro mirror is in the state of "OFF", the micro mirror reflects light from the light source 61 toward the OFF light plate 27 held on the side surface of the lighting bracket 26 illustrated in FIG. 7 (see the arrow L1 of FIG. 8). Therefore, by individually driving each mirror, it is possible to control the projection of light for each pixel of the image data, thereby generating the image.

Light reflected toward the OFF light plate 27 (not illustrated) is absorbed in the form of heat and is cooled by the flow of the outdoor air.

Figure 10:
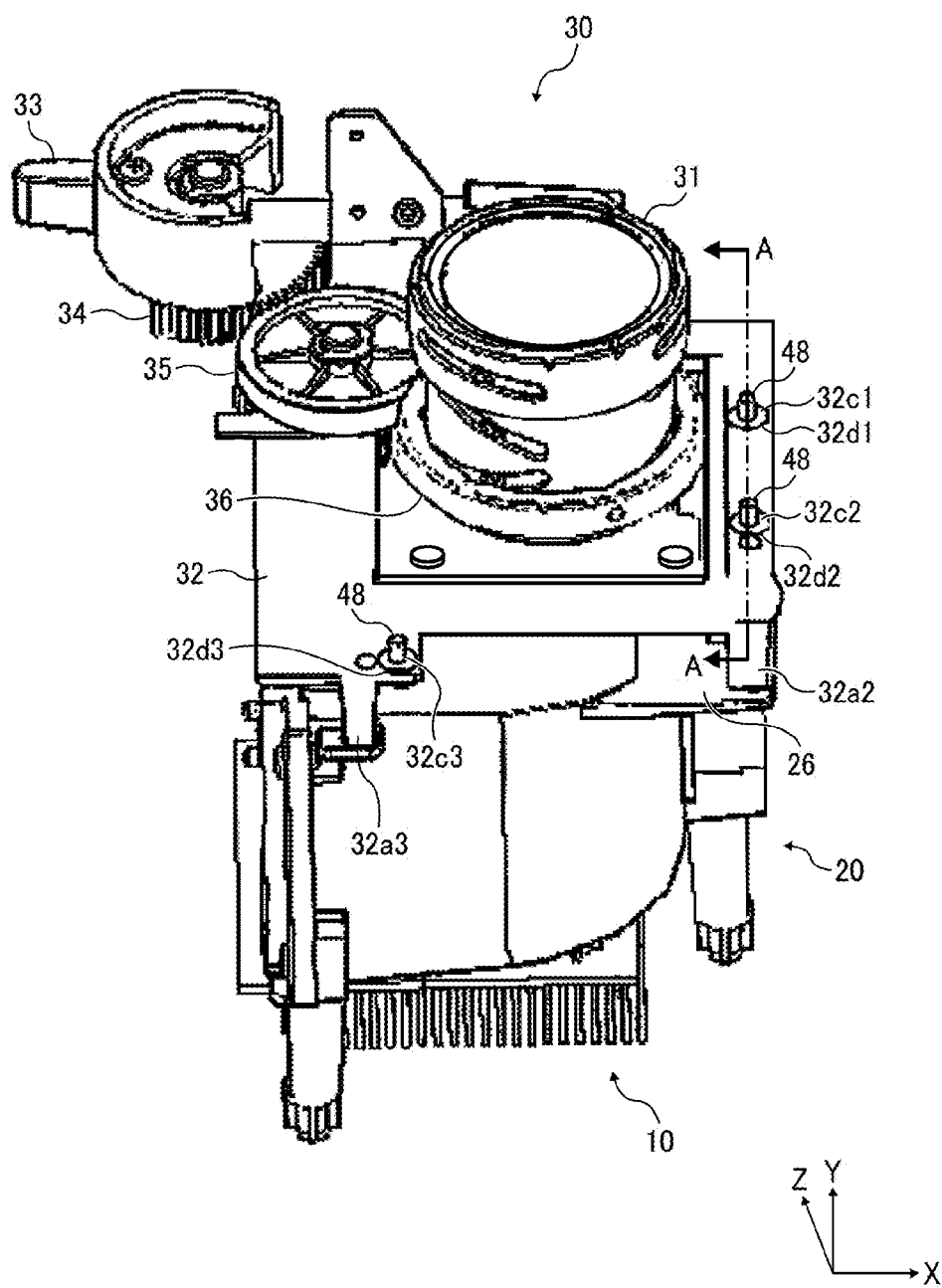
FIG. 10 is a perspective view illustrating a first optical unit, together with the illumination unit and the image forming unit according to an embodiment of the present invention.

FIG. 10 is a perspective view illustrating the first projection optical system 30, together with the illumination unit 20 and the light modulator 10.

As illustrated in FIG. 10, the first projection optical system 30 is disposed above the illumination unit 20, and has a projection lens 31 that holds the first optical system 70 (FIG. 3) including a plurality of lenses, and a lens holder 32 that holds the projection lens 31. The lens holder 32 is provided with four legs 32a1 to 32a4 extending downward (only the legs 32a2 and 32a3 are illustrated in FIG. 10, the leg 32a1 is illustrated in FIG. 4, and the leg 32a4 is illustrated in FIG. 6). On the bottom surface of each of the legs 32a1 to 32a4, screw holes to be screwed into the lighting bracket 26 are formed.

Furthermore, the projection lens 31 is provided with a focus gear 36, and the idler gear 35 engages with the focus gear 36. The lever gear 34 engages with the idler gear 35, and the focus lever 33 is fixed to the rotary shaft of the lever gear 34. As illustrated in FIG. 1, a leading end portion of the focus lever 33 is exposed from the apparatus main body.

As the focus lever 33 is moved, the focus gear 36 rotationally moves via the lever gear 34 and the idler gear 35. When the focus gear 36 rotationally moves, the plurality of lenses forming the first optical system 70 in the projection lens 31 moves in a predetermined direction, respectively, and the focus of the projection image is adjusted.

Furthermore, the lens holder 32 has screw through-holes 32c1 to 32c3 at four positions, and screws 48 for screwing the second projection optical system 40 to the first projection optical system 30 pass through the screw through-holes (in FIG. 10, three screw through-holes are illustrated, a state in which the screws 48 pass through each of screw through-holes 32c1 to 32c3 is illustrated, and the leading end sides of the screw portions of the screws 48 are visible in FIG. 10). Furthermore, second projection optical system positioning protrusions 32d1 to 32d3 protruding from the surface of the lens holder 32 are formed around each of the screw through-holes 32c1 to 32c4 (in FIG. 10, 32d1 to 32d3 are illustrated).

Figure 11:
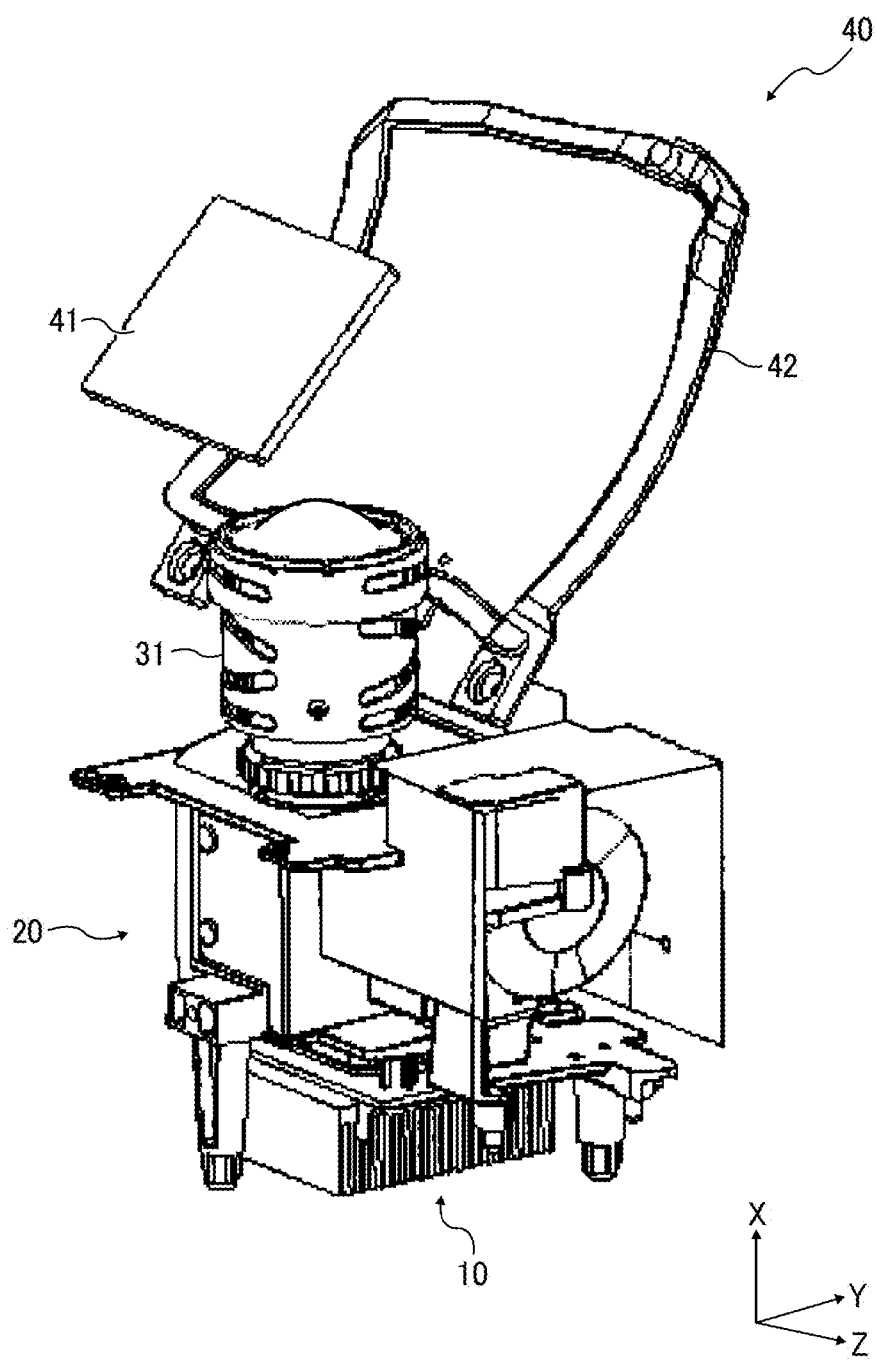
FIG. 11 is a cross-sectional view taken from a line A-A of FIG. 10.

FIG. 11 is a perspective view illustrating a second optical system included in the second projection optical system 40, together with the projection lens 31, the illumination unit 20, and the light modulator 10. As illustrated in FIG. 11, the second projection optical system 40 is provided with a reflecting mirror 41 forming the second optical system, and a curved mirror 42 having a concave shape. The surface that reflects light of the curved mirror 42 can have a spherical shape, a rotationally symmetric aspherical surface shape, a free curved surface shape or the like.

Figure 12:
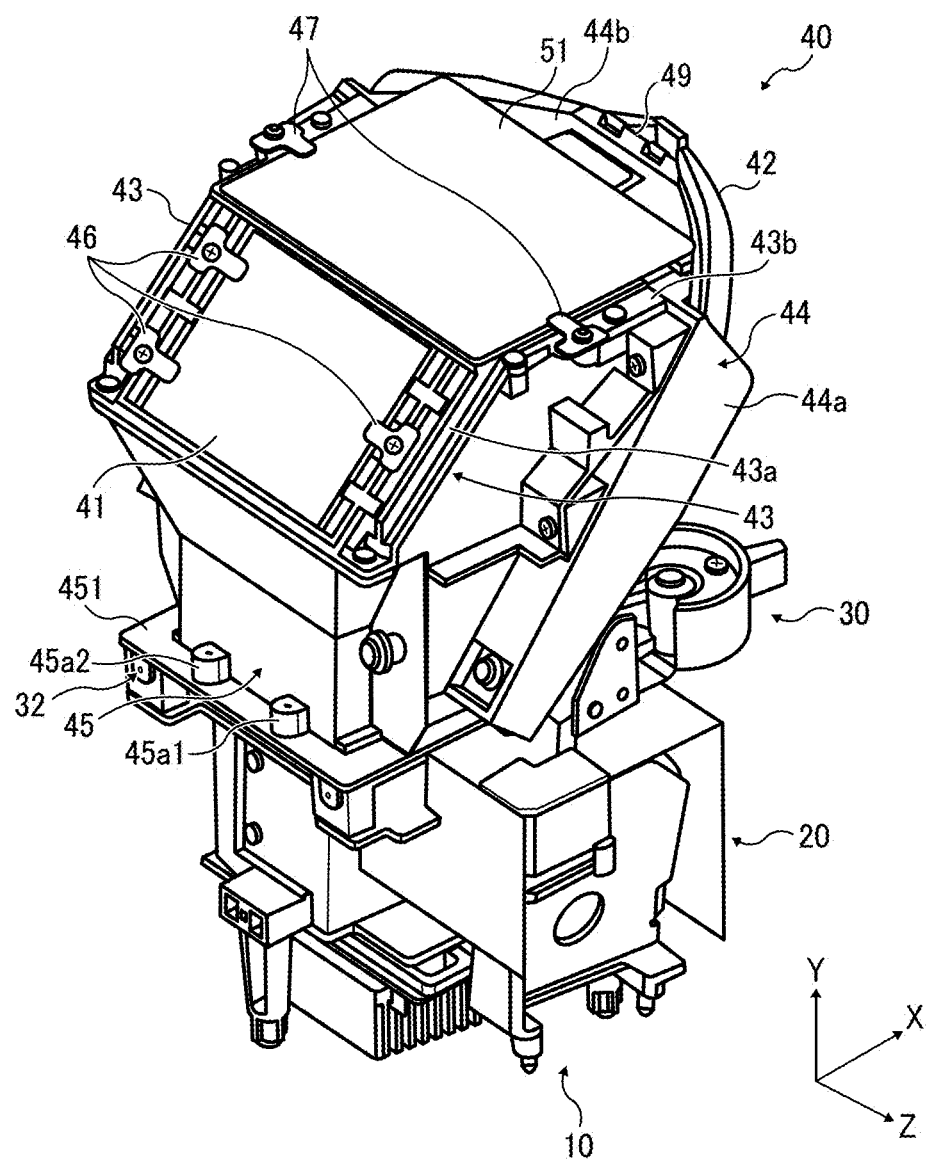
FIG. 12 is a perspective view illustrating a second optical system held by a second optical unit, together with a projection lens unit, the illumination unit and the image forming unit according to an embodiment of the present invention.

FIG. 12 is a perspective view illustrating the second projection optical system 40, together with the first projection optical system 30, the illumination unit 20, and the light modulator 10. As illustrated in FIG. 12, the second projection optical system 40 is also provided with a dust-proof glass 51 that transmits the light image reflected from the curved mirror 42 and protects the optical system components in the apparatus from dust. In addition, symbol L in FIG. 11 indicates radiated light from the light source.

The second projection optical system 40 has a mirror bracket 43 that holds the reflecting mirror 41 and the dust-proof glass 51. Furthermore, the second projection optical system 40 has a free mirror bracket 44 configured to hold the curved mirror 42, and a mirror mount 45 to which the mirror bracket 43 and the free mirror bracket 44 are attached.

The mirror mount 45 has a box-like shape, the upper surface, the lower surface, and the back side thereof in the X-direction in the drawings are opened, and the mirror mount 45 is in the form of a substantially U-shape when viewed from above. Edges extending in the X-direction in each of the front side and the back side in the Z-direction of the upper opening of the mirror mount 45 are formed of a slope, and a parallel portion. The slope is sloped so as to rise toward the back side in the X-direction from the front side end in the X-direction in the drawings. The parallel portion is parallel to the X-direction in the drawings. In addition, the slope is located on the front side in the X-direction in the drawings from the parallel portion. Furthermore, edges extending in the Z-direction on the front side in the X-direction of the drawings of the upper opening of the mirror mount 45 are parallel to the Z-direction in the drawings.

The mirror bracket 43 is attached to the top of the mirror mount 45. The mirror bracket 43 has a sloped surface 43a that is sloped so as to rise toward the back side in the X-direction from the front side end in the X-direction in the drawings coming into contact with the slope of the upper opening edge of the mirror mount 45. Furthermore, the mirror bracket 43 also has a parallel surface 43b parallel to the X direction that comes into contact with the parallel portion of the upper opening edge of the mirror mount 45. The sloped surface 43a and the parallel surface 43b have the opening, respectively, the reflecting mirror 41 is held so as to close the opening of the sloped surface 43a, and the dust-proof glass 51 is held so as to close the opening of the parallel surface 43b.

Both ends in the Z-direction of the reflecting mirror 41 are pressed against the sloped surface 43a of the mirror bracket 43 by a mirror pressing member 46 having a flat spring shape, and thus, the reflecting mirror 41 is positioned and held on the sloped surface 43a of the mirror bracket 43. One end in the Z-direction of the reflecting mirror 41 is fixed by two mirror pressing members 46, and the other end thereof is fixed by one mirror pressing member 46.

Both ends in the Z-direction of the dust-proof glass 51 are pressed against the parallel surface 43b of the mirror bracket 43 by a glass pressing member 47 having the flat spring shape, and thus, the dust-proof glass 51 is positioned and fixed to the mirror bracket 43. The dust-proof glass 51 is held by the one glass pressing member 47 at each of both ends in the Z-direction.

The free mirror bracket 44 configured to hold the curved mirror 42 has arms 44a sloped so as to descend toward the front side from the back side in the X-direction of the drawings, on the front side and the back side in the Z-axis direction. Furthermore, the free mirror bracket 44 has a connector 44b that connects the two arms 44a at the top of the arms 44a. The arms 44a of the free mirror bracket 44 are attached to the mirror mount 45 so that the curved mirror 42 covers the opening of the back side in the X-direction in the drawings of the mirror mount 45.

At the upper end of the curved mirror 42, a substantially center of an end at the side of the dust-proof glass 51 is pressed against the connector 44b of the free mirror bracket 44 by a free mirror pressing member 49 having the flat spring shape. Furthermore, both ends in the Z-axis direction in the drawings of the first optical system side of the curved mirror 42 are fixed to the anus 44a of the free mirror bracket 44 by the screws.

The second projection optical system 40 is loaded and fixed to the lens holder 32 of the first projection optical system 30. Specifically, a lower surface 451 facing the upper surface of the lens holder 32 is provided below the mirror mount 45. Tubular screw stoppers 45a1 to 45a3 for being screwed to the first projection optical system 30 are formed at four positions of the lower surface 451 (the screw stoppers 45a1 and 45a2 are illustrated in FIG. 12, the screw stopper 45a3 is illustrated in FIG. 6, and the remaining screw stoppers are not illustrated). The second projection optical system 40 is screwed to the first projection optical system 30, by allowing the screws 48 to pass through screw through-holes 32c1 to 32c3 provided in the lens holder 32 of the first projection optical system 30, and by screwing the screws 48 to the screw stoppers 45a1 to 45a3. At this time, the lower surface of the mirror mount 45 of the second projection optical system 40 abuts against the second projection optical system positioning protrusions 32d1 to 32d4 of the lens holder 32, and the second projection optical system 40 is fixed by being positioned in the Y-direction.

When the second projection optical system 40 is loaded and fixed to the lens holder 32 of the first projection optical system 30, as illustrated in FIG. 10, a portion above the lens holder 32 of the projection lens 31 is housed in the mirror mount 45 of the second projection optical system 40. Furthermore, when the second projection optical system 40 is loaded and fixed to the lens holder 32, a gap is present between the curved mirror 42 and the lens holder 32, and the idler gear 35 (see FIG. 10) enters the gap.

Figure 13:
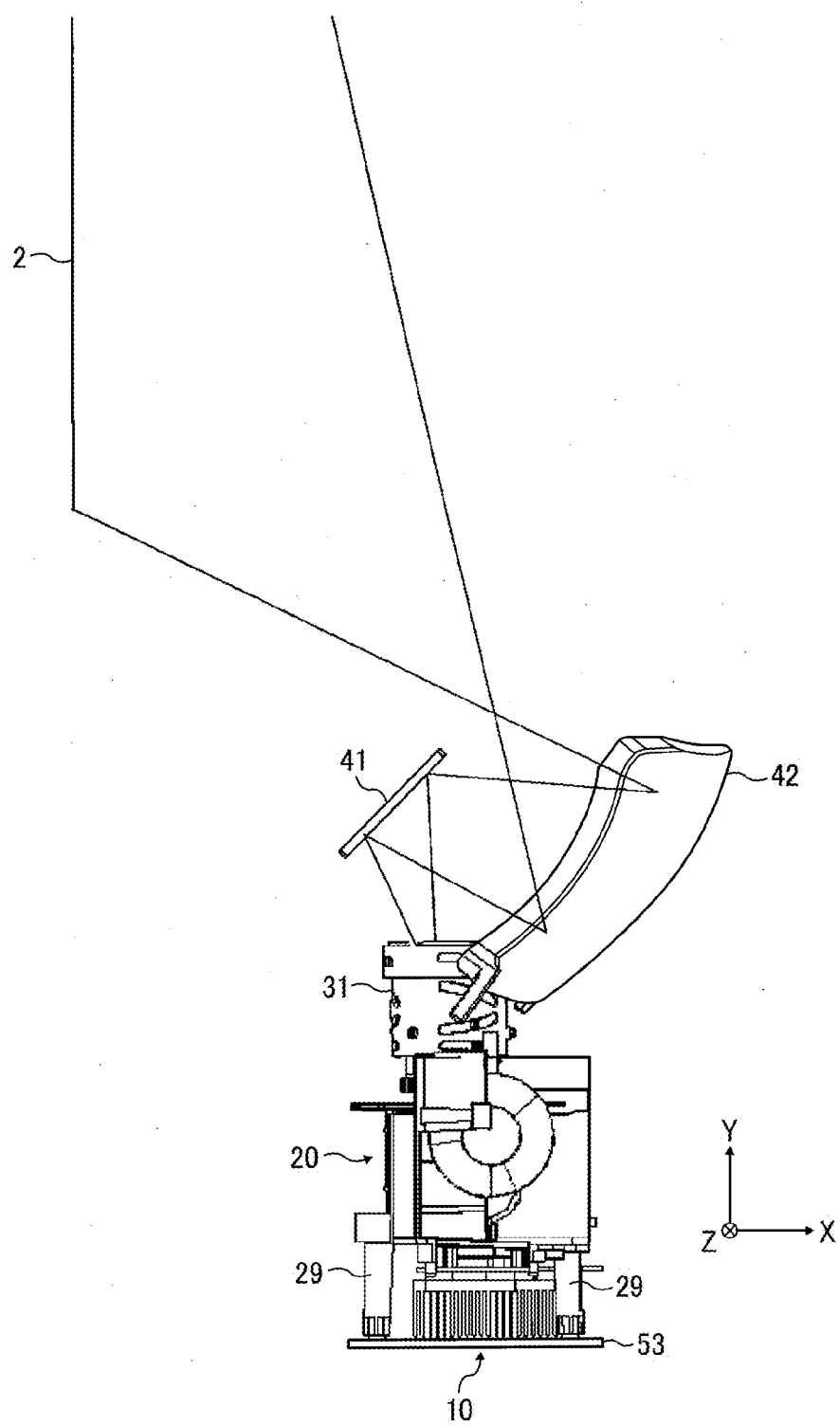
FIG. 13 is a perspective view illustrating the second optical unit, together with the first optical unit, the illumination unit, and the image forming unit according to an embodiment of the present invention.

FIG. 13 is a perspective view illustrating the optical path from the first optical system 70 to the projection plane 2 (screen).

Optical flux transmitted through the projection lens 31 constituting the first optical system 70 forms a conjugated intermediate image on the image generated in the DMD 12 between the reflecting mirror 41 and the curved mirror 42. This intermediate image is imaged as a curved surface image between the reflecting mirror 41 and the curved mirror 42. Next, the diverging optical flux after imaging the intermediate image is incident on the curved mirror 42 having the concave shape, is converted into a convergent optical flux, converts the intermediate image into "further expanded image" by the curved mirror 42, and projects the image onto the projection plane 2.

Thus, the projection optical system is constituted by the first optical system 70 and the second optical system, and the intermediate image is formed between the first optical system 70 and the curved mirror 42 of the second optical system and is expanded and projected by the curved mirror 42, thereby being able to shorten the projection distance, and to use the projection optical system in a small conference room or the like.

Furthermore, as illustrated in FIG. 13, the first projection optical system 30 and the second projection optical system 40 are loaded and fixed to the lighting bracket 26. The light modulator 10 is also fixed. Thus, the legs 29 of the lighting bracket 26 are fixed to the base member 53 so as to support the weight of the first projection optical system 30, the second projection optical system 40, and the light modulator 10.

As illustrated in FIG. 1, on one Y-X plane of the exterior cover 59 of the projector 1, an open intake duct for sucking the air outside the apparatus is provided. The intake cover 84a formed with a grid is attached to the intake duct.

Figure 14:
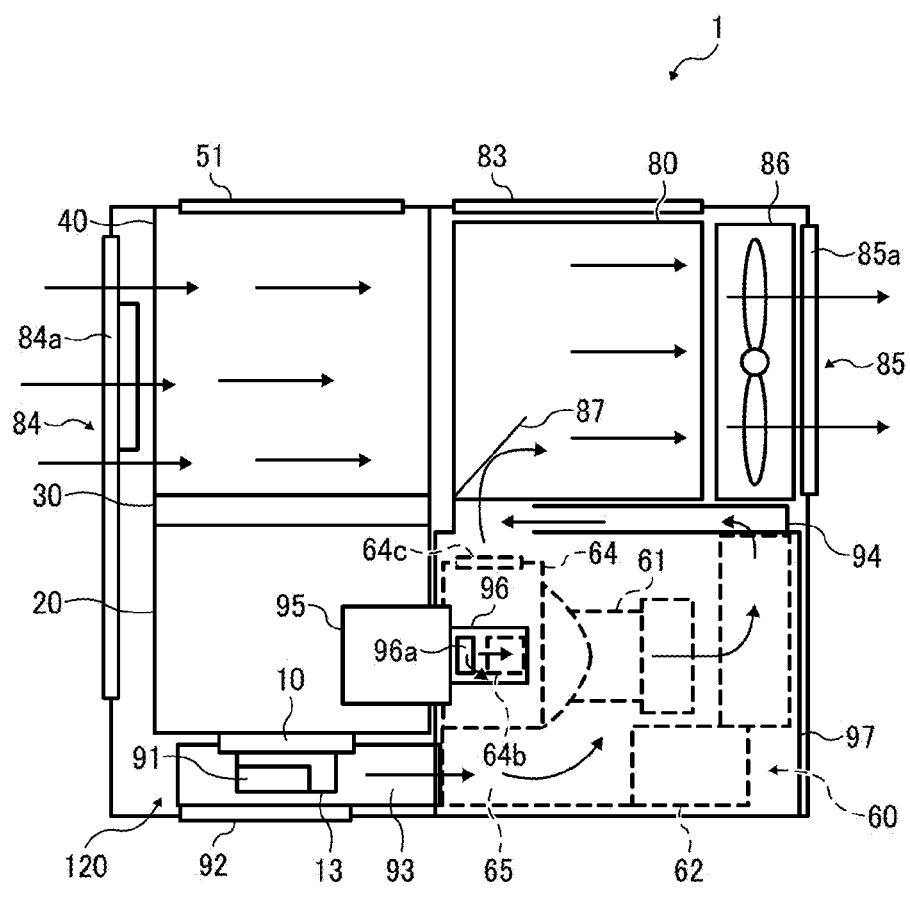
FIG. 14 is an explanatory diagram illustrating the flow of air in the projector according to an embodiment of the present invention.

As illustrated in FIG. 14, an exhaust duct 85 to which the exhaust cover 85a formed with the grid is attached is provided on the surface on the opposite side to the surface on which the intake duct of the exterior cover 59 is provided. The exhaust fan 86 is further provided so as to face the exhaust duct 85. By exhausting the air heated by the light source and the like in the apparatus from the exhaust duct 85 by the exhaust fan 86, a negative pressure is formed in the apparatus, and the air outside the apparatus is taken from the intake duct 84. After the air taken from the intake duct 84 flows to a heat generation source such as a light source to cool the heat generation source, the sucked air is exhausted through the exhaust duct 85 by the exhaust fan 86.

In recent years, higher image quality of the projection image is desired. To meet the requirements of higher image quality of the projection image, the power supplied to the light source is increased, thereby increasing the intensity of the light source to improve the brightness of the projection image. As the power supplied to the light source increases, calorific value of the power supply and the light source 61 in the apparatus increases, thus making difficult to sufficiently cool the heat generation source such as the light source. In view of this, the rotational speed of the exhaust fan 86 may be increased to increase the outside air taken from the intake duct 84. This, however, increases noise of the exhaust fan 86 due to the wind noise.

To increase the amount of air to be taken from the outside through the intake duct, the width of the grid of the cover member, such as the width of the grid of the intake cover 84a, may be narrowed, thus increasing an aperture ratio of the cover member. This may, however, reduce the strength of the grid, such that the cover member such as the intake cover 84a may be damaged as an object hits against the cover member. While the thickness of the bars of the grid (the length in the depth direction) may be made thick, the size of the apparatus may increase. Further, with the increased thickness, the pressure loss increases when the air exits the grid, thus suppressing the amount of air to be taken from the outside. The above-described drawbacks can be observed for the exhaust duct that exhausts the air in the apparatus.

In view of the above, there is a need for an image projection apparatus capable of increasing the aperture ratio of the grid while maintaining the strength of the grid portion and suppressing an increase in size of the apparatus.

More specifically, the inventors of the present invention have found a shape of the intake cover 84a that is able to suppress the reduction in strength of the grid, to suppress enlargement of the apparatus, and to suppress the increase of pressure loss when passing through the grid, while increasing the aperture ratio of the intake cover 84a, by performing the verification tests described below. The verification test performed by the inventors will be described below.

In the verification tests, the deformation when applying force F to the central portion of the model having the simplified intake cover was verified by FEM analysis. The force F to be applied to the intake cover is force that is applied to the intake cover when performing "4.2.5 Impact Test of J60950 Safety of Information Technology Equipment". The above-described "4.2.5 Impact Test of J60950 Safety of Information Technology Equipment" is a test in which hard steel with a smooth surface having a diameter of about 50 [mm] and a weight of 500 [g]±25 [g] is caused to freely fall on the test sample from the vertical distance of 1.3 mm.

Figure 15:
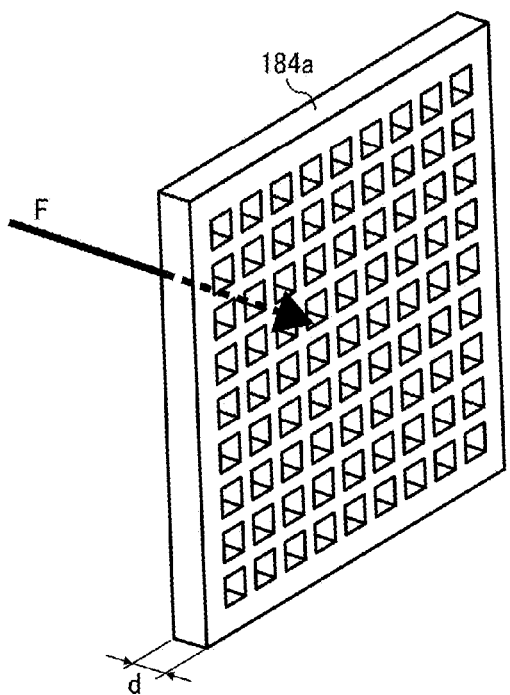
FIG. 15 is a perspective view illustrating an intake cover of a first comparative example.
Figure 16:
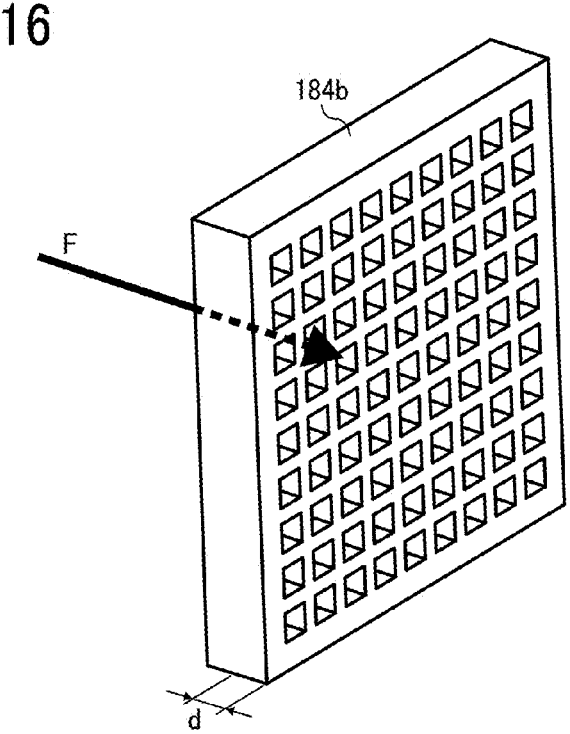
FIG. 16 is a perspective view illustrating an intake cover of a second comparative example.
Figure 17:
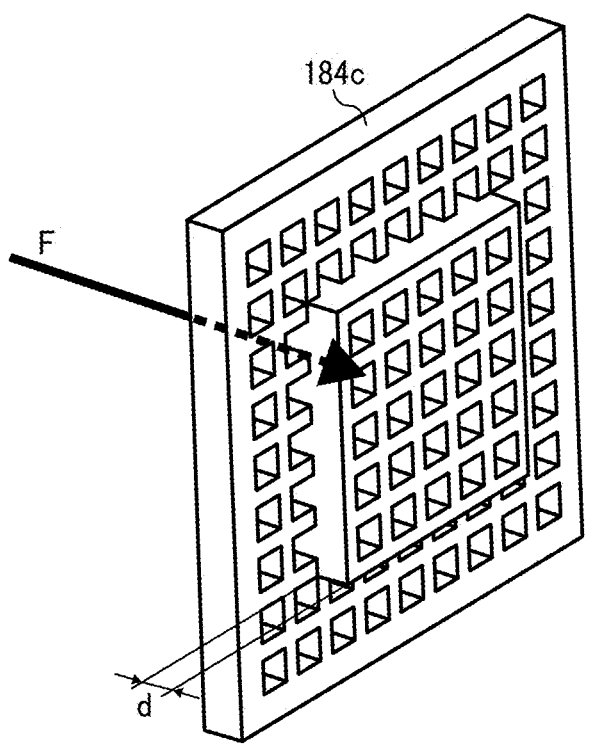
FIG. 17 is a perspective view illustrating the intake cover of an example.

The verification test was performed on the following three intake covers. That is, the intake covers include an intake cover 184a having a thickness d [mm] illustrated in FIG. 15 (hereinafter, referred to as an intake cover of a first comparative example), an intake cover 184b illustrated in FIG. 16 (hereinafter, referred to as an intake cover of a second comparative example) thicker than the intake cover 184a of the first comparative example, and an intake cover 184c (hereinafter, referred to as an intake cover of an example) illustrated in FIG. 17 that is thickened only in the central portion. The width of the grid of each intake cover is the same.

Figure 18:
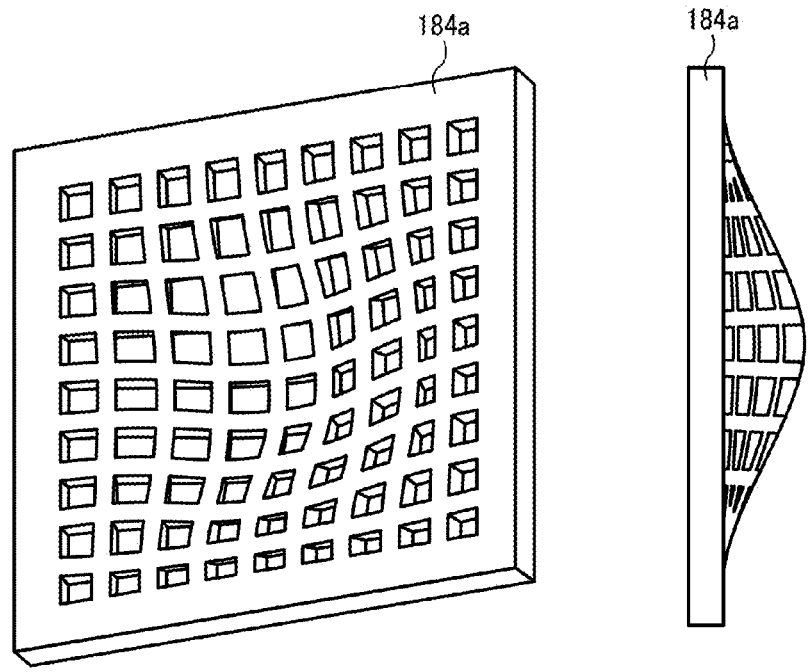
FIG. 18 is a diagram illustrating a verification result of the intake cover of a first comparative example.
Figure 19:
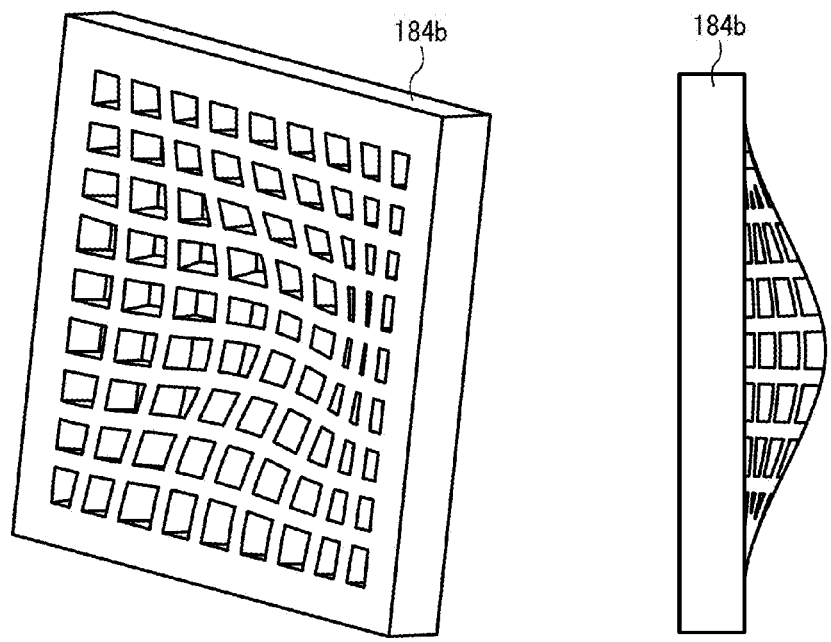
FIG. 19 is a diagram illustrating a verification result of the intake cover of a second comparative example.
Figure 20:
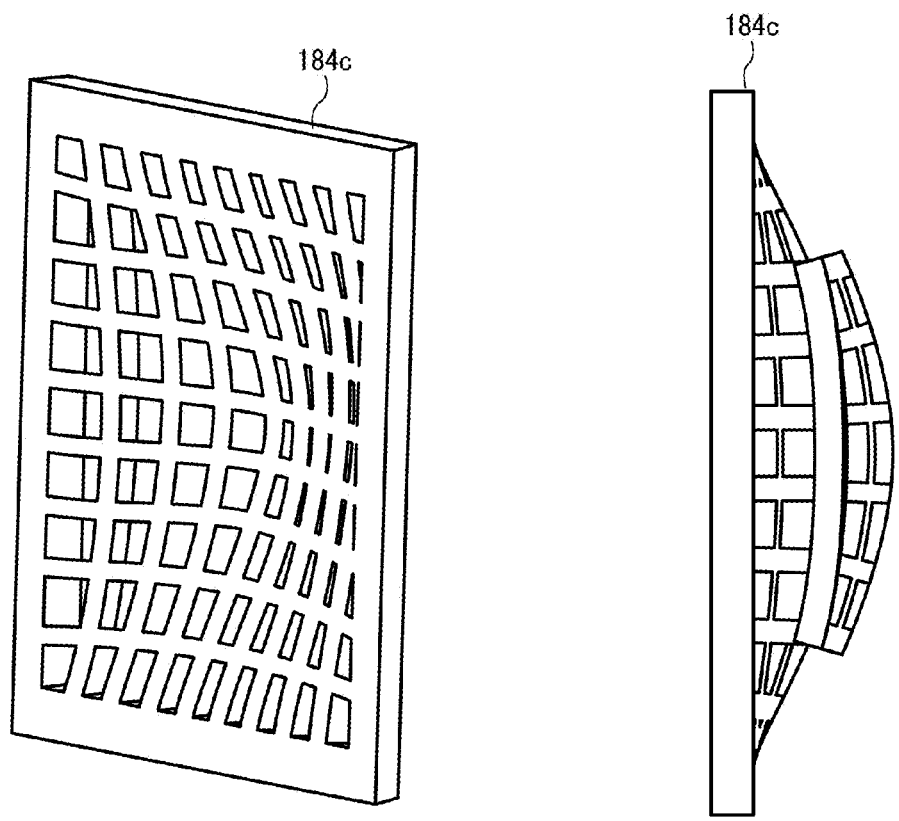
FIG. 20 is a diagram illustrating the verification result of the intake cover of the example.
Figure 21:
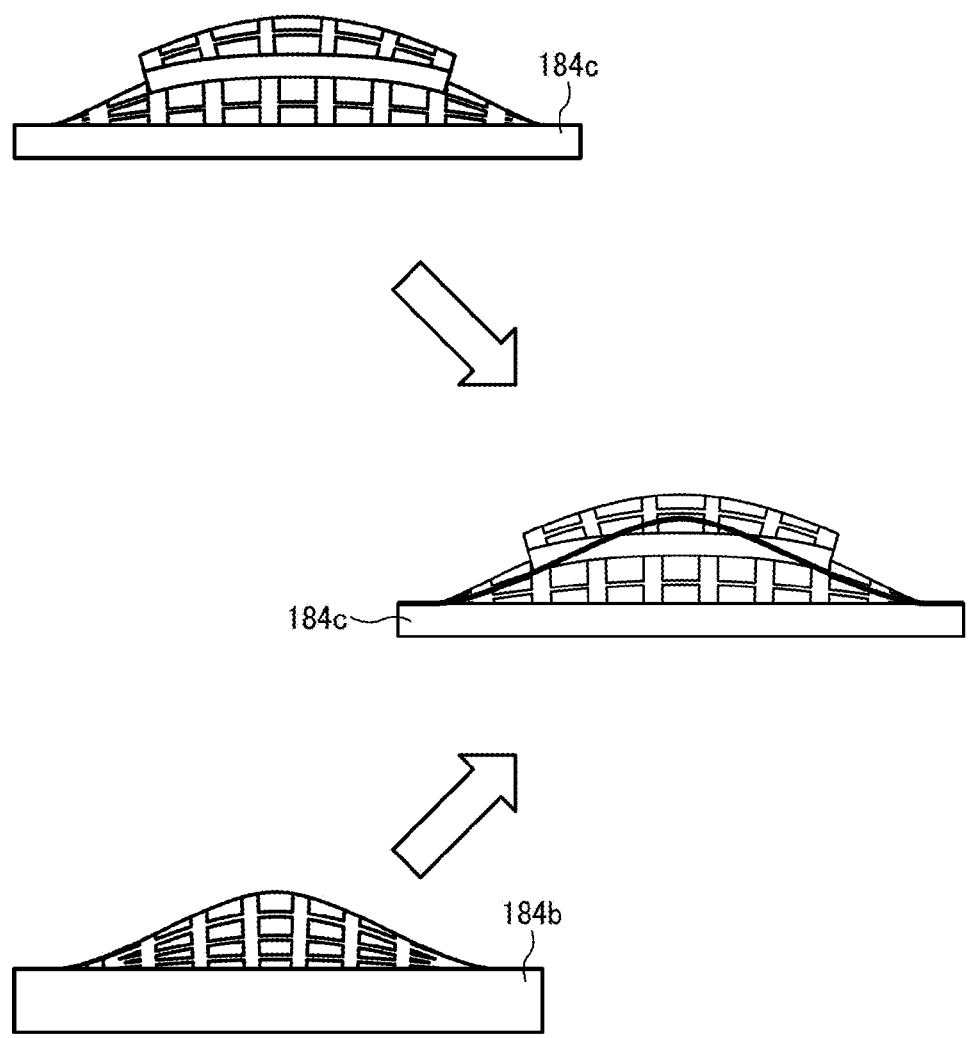
FIG. 21 is a diagram illustrating a comparison of displacement between the intake cover of the second comparative example and the intake cover of the example.

FIG. 18 is a diagram illustrating the verification result of the intake cover 184a of the first comparative example, FIG. 19 is a diagram illustrating the verification result of the intake cover 184b of the second comparative example, and FIG. 20 is a diagram illustrating the verification result of the intake cover 184c of the example. Furthermore, FIG. 21 is a diagram illustrating the comparison of the displacement of the intake cover of the second comparative example and the displacement of the intake cover 184c of the example.

In the intake cover 184a of the first comparative example, as a result of the FEM analysis, it was confirmed that stress was concentrated in the central portion. In the intake cover 184b of the second comparative example, it was confirmed that stress was concentrated in the central portion as in the intake cover 184a of the first comparative example. However, it was confirmed that the stress generated at this time was 27% of the stress generated in the intake cover 184a of the first comparative example, resulting in nearly 70% decrease in stress and the increase in strength of the intake cover.

Stress generated in the intake cover 184b of the example was 29% of stress generated in the intake cover 184a of the first comparative example. Thus, it was confirmed that the intake cover 184c of the example has the same strength as that of the entirely thick intake cover 184b of the second comparative example. The reason is as follows. That is, unlike the intake covers of the first and second comparative examples, in the intake cover 184c of the example, it was confirmed that stress was also generated in portions other than the central portion and stress was dispersed. As can be seen from FIG. 21, in the intake cover 184c of the example, the amount of displacement other than the central portion (around the intake cover edges) is greater than the amount of displacement ("bold line" in FIG. 21) of the intake cover 184b of the second comparative example. Therefore, unlike the intake covers of the first and second comparative examples, it was confirmed that the intake cover 184c of the example was entirely bent to absorb impact. Thus, since the intake cover 184c of the example is entirely bent to absorb the impact, the intake cover 184c of the example has the same strength as the entirely thick intake cover 184b of the second comparative example.

As can be seen from this verification tests, by making only the central portion of the intake cover 184c be thick, the strength can be increased to the same extent as a case of the entirely thick intake cover, thereby preventing damage to the intake cover as compared to the intake cover of the first comparative example. Furthermore, a member of the apparatus disposed opposite to the edge portion periphery of the intake cover thinner than the central portion can be disposed to be closer to the grid than the central portion. Thus, it is possible to suppress enlargement of the apparatus compared to the intake cover of the second comparative example in which the thickness of the entire grid is thick. Furthermore, the configuration of the example can suppress pressure loss of air passing through the grid around the edge portions of the intake cover, compared to the thick central portion. Thus, the pressure loss of the air can be suppressed as compared to the intake cover of the second comparative example in which the entire grid is thick, thereby increasing the amount of air to be taken or exhausted. This increases the amount of air to be taken or exhausted, without increasing the rotational speed of the fan, thus, efficiently cooling the light source in the apparatus and the heating source such as a power supply. The intake cover 184c of this example further reduces the material cost of the intake cover, thus, reducing the cost of the apparatus as compared to the second comparative example.

In this example, it is preferred that the thick portion of the thickness of the grid be about ($\frac{1}{5}$) to ($\frac{1}{2}$) of the total area of the intake cover 84a. If the thickness is less than ($\frac{1}{5}$), there is a fear of a failure to obtain sufficient reinforcing effect. Meanwhile, if the thickness exceeds ($\frac{1}{2}$), it may not be possible to sufficiently obtain the effect, compared to the intake cover 84a of the second comparative example.

Next, the intake cover of this embodiment will be described in detail.

Figure 22:
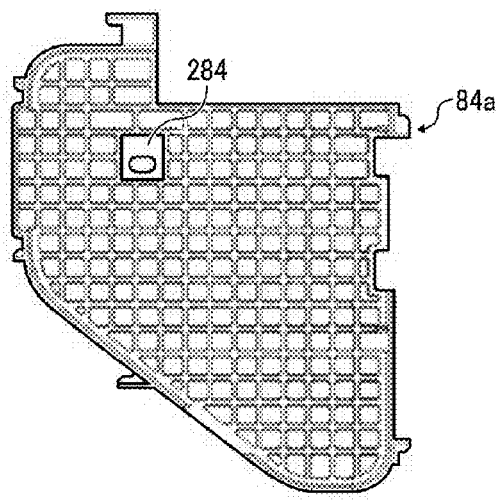
FIG. 22 is a front view illustrating the intake cover of an embodiment of the present invention.

FIG. 22 is a front view illustrating the intake cover 84a of this embodiment.

As illustrated in FIG. 22, the intake cover 84a of the present embodiment is formed with through-holes 284 through which screws for being attached to the apparatus pass.

Figure 23:
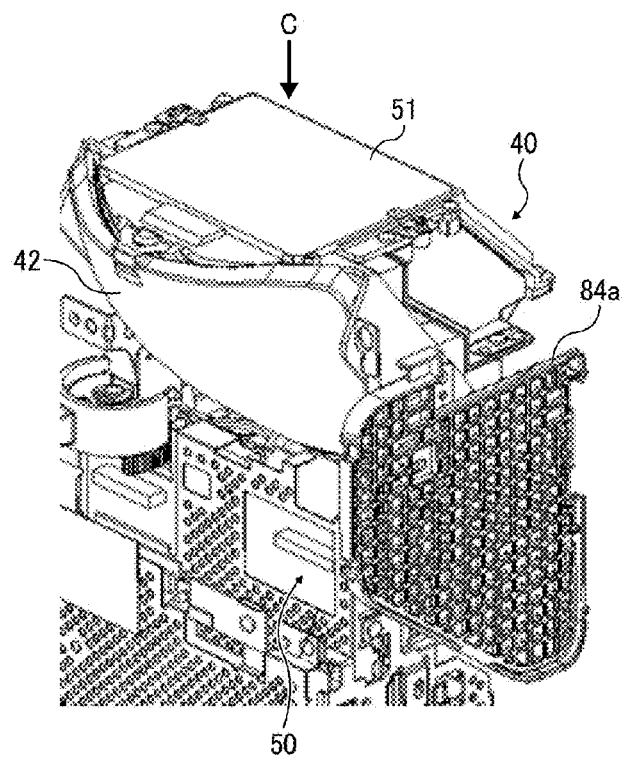
FIG. 23 is a perspective view illustrating the internal structure of an apparatus around the intake cover according to an embodiment of the present invention.
Figure 24:
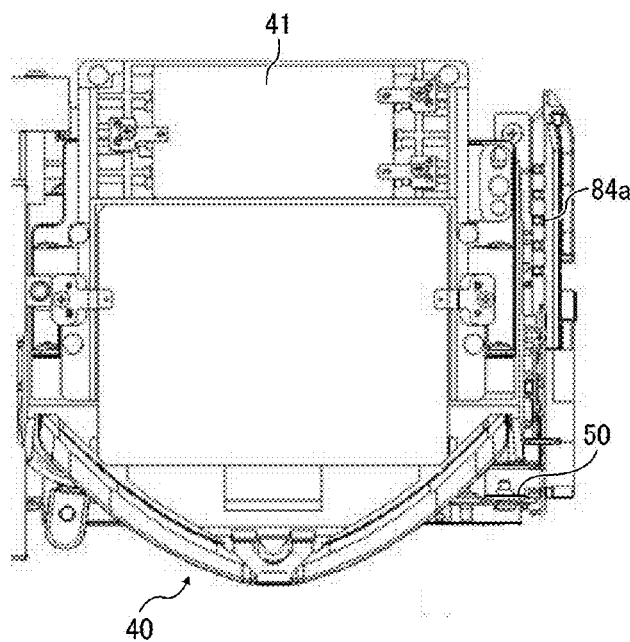
FIG. 24 is a diagram as viewed from a direction C of FIG. 23.
Figure 25:
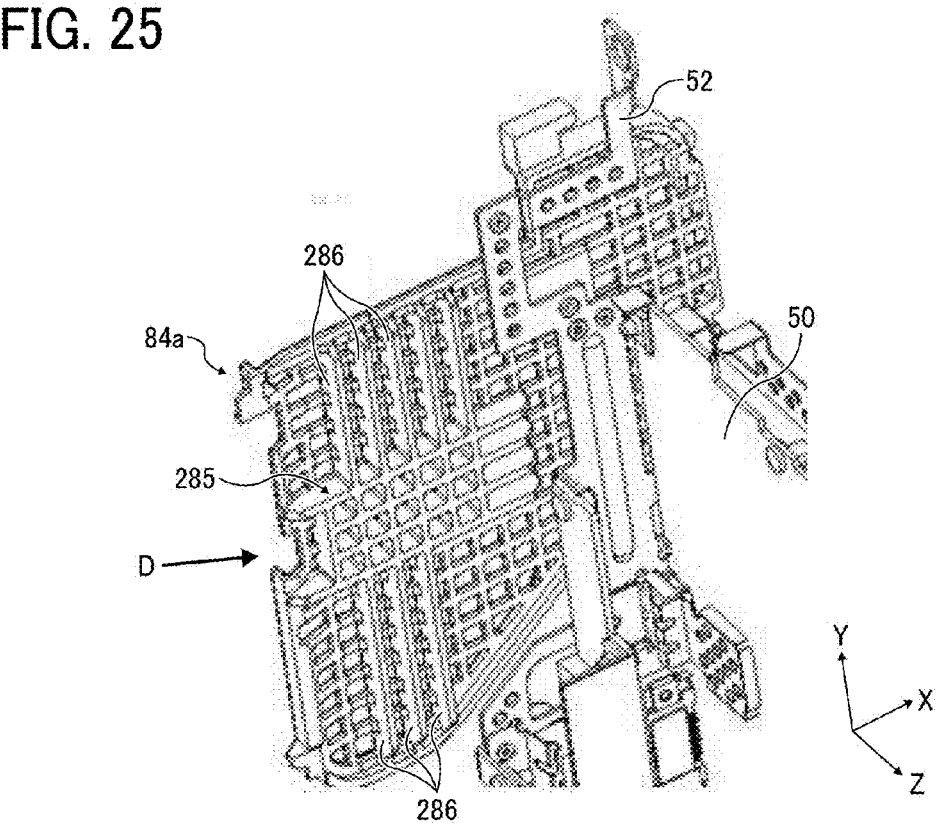
FIG. 25 is a perspective view illustrating an aspect of attachment of the intake cover.
Figure 26:
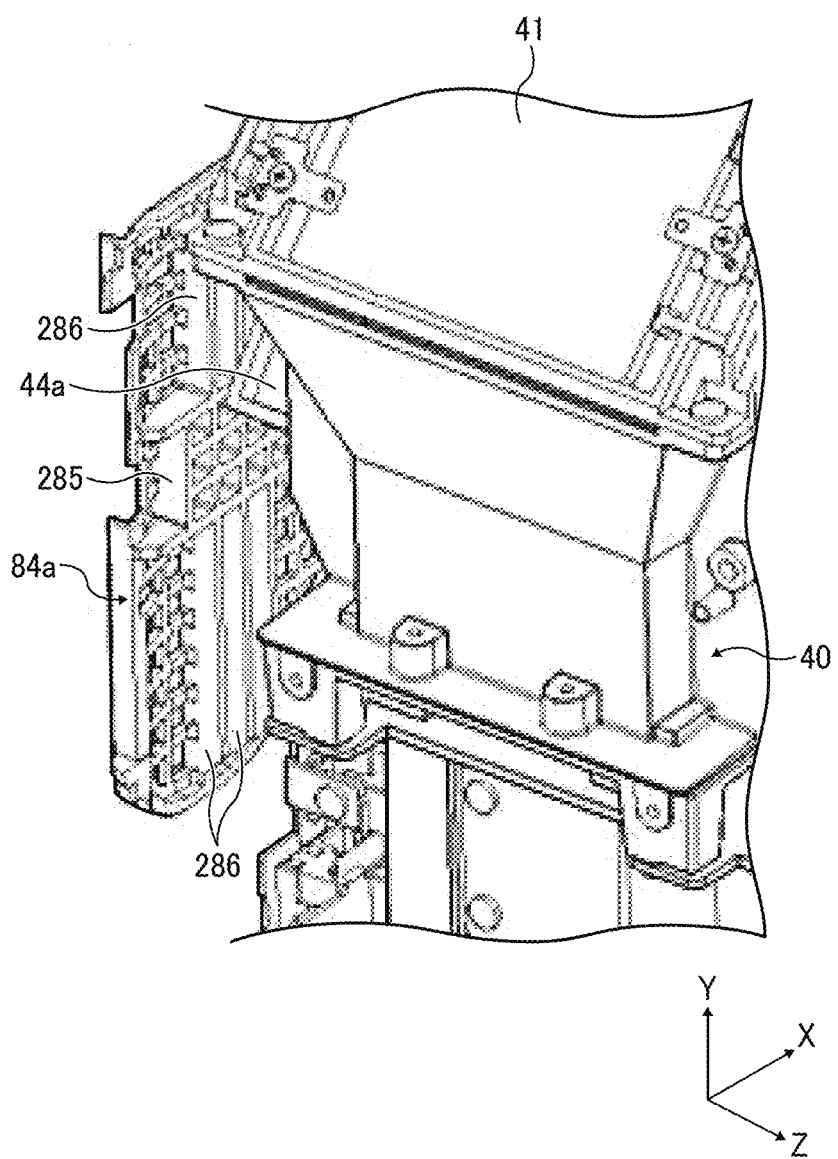
FIG. 26 is a perspective view illustrating the intake cover and the second projection optical system according to an embodiment of the present invention.

FIG. 23 is a perspective view illustrating the internal structure of the apparatus around the intake cover 84a. FIG. 24 is a diagram as viewed from the direction C of FIG. 23. FIG. 25 is a perspective view illustrating the state of attachment of the intake cover 84a. FIG. 26 is a perspective view illustrating the intake cover 84a and the second projection optical system 40.

As illustrated in FIGS. 23 and 24, the intake cover 84a faces a control board 50 that controls the second projection optical system 40, the DMD and the like.

As illustrated in FIG. 25, the intake cover 84a is fixed to the fixing member 52 to which the control board 50 is fixed. Specifically, by inserting the screws into the through-holes 284 of the intake cover 84a as illustrated in FIG. 22, and by fastening the screws to the fixing member 52, the intake cover 84a is attached to the fixing member 52.

As illustrated in FIG. 25, a reinforcing grid portion 285 thicker than other grids is provided from the central portion of the intake cover 84a to the left portion in FIG. 25. Furthermore, from the reinforcing grid portion 285, several bars of a plurality of bars forming the grid extending in the vertical direction also become the reinforcing bar 286 thicker than other bars. The control board 50 is disposed to face the thinner portion on the right side of FIG. 25 than the central portion of the intake cover 84a. Furthermore, when viewed from the D direction of FIG. 25, a part of the control board 50 is disposed to overlap the reinforcing grid portion 285.

Assuming that the entire intake cover 84a is made to have the same thickness as the reinforcing grid portion 285 to improve the strength of the intake cover 84a, the control board 50 would be disposed at a position shifted in the Z direction of FIG. 25 by the thickness of the grid, compared to the configuration of FIG. 25. As a result, the apparatus becomes larger by the thickness. In the present embodiment, the thickness of the portion of the intake cover 84a that the control board 50 faces is substantially the same as the conventional configuration having the large width of the grid and the small aperture ratio. Therefore, it is possible to suppress a decline in strength and suppress enlargement of the apparatus, while increasing the aperture ratio.

As illustrated in FIG. 26, a portion of the intake cover 84a formed with the reinforcing grid portion 285 and the reinforcing bars 286 faces the second projection optical system 40. Specifically, the second projection optical system 40 is oppositely disposed in the elastic deformation range of the intake cover 84a. With such a configuration, when an object hits against the intake cover 84a and is elastically deformed into the apparatus inner side, the reinforcing grid portion 285 of the intake cover 84a comes into contact with the arm portion 44a of the free mirror bracket 44 of the second projection optical system 40. Thus, in the intake cover 84a, the thick reinforcing grid portion 285 becomes a form supported by the second projection optical system 40, and it is possible to absorb the impact received by the intake cover 84a. This further suppresses damage to the intake cover 84a.

Next, the air flow in the projector will be described.

FIG. 14 is an explanatory diagram illustrating the flow of air inside the projector 1 of the present embodiment. FIG. 14 is a view in which the projector 1 is viewed from the direction (X-direction) perpendicular to the projection plane 2. As illustrated in FIG. 14, the intake duct 84 that takes the air outside the apparatus into the projector 1 is provided on one side (a left side in FIG. 14) of the side surface of the projector 1. The intake cover 84a described above is attached to the intake duct 84. The exhaust duct 85 that exhausts the air inside the projector 1 is provided on the other side (a right side of FIG. 14) of the side surface of the projector 1. The grid-like exhaust cover 85a is attached to the exhaust duct 85. Furthermore, the exhaust fan 86 is provided to face the exhaust cover 85a.

When the projector 1 is viewed from the direction (X-direction) perpendicular to the projection plane 2, parts of the exhaust duct 85 and the intake duct 84 are provided to be located between the light source unit 60 and the operation unit 83. The outside air taken from the intake duct 84 goes around the ZY plane of the mirror mount 45 of the second projection optical system 40 and the rear surface of the curved mirror 42, and moves toward the exhaust duct 85, while going along the rear surface of the mirror mount 45 and the curved mirror 42. The power supply unit 80 disposed above the light source unit 60 has a shape in which the U-shaped light source unit 60 side is opened by the arrangement of the three boards. Air moved toward the exhaust duct 85 while going along the rear surface of the mirror mount 45 and the curved mirror 42 flows into the space surrounded by the power supply unit 80, and is discharged from the exhaust duct 85.

By providing the exhaust duct 85 and the intake duct 84 so as to be located between the light source unit 60 and the operation unit 83, when the projector 1 is viewed from the direction (X-direction) perpendicular to the projection plane 2, it is possible to obtain the following effects. That is, there is an effect of being able to generate the air flow discharged from the exhaust duct 85 through between the light source unit 60 and the operation unit 83.

Furthermore, a light source blower 95 is disposed near the light source unit 60. Air sucked by the light source blower 95 flows in the light source air supply port 64b of the holder 64 through the light source duct 96 (see FIG. 5). A part of the air flowing into the light source duct 96 flows between the light source housing 97 and the exterior cover 59 through the opening portion 96a formed on the opposite surface to the exterior cover 59 of the light source duct 96 (see FIG. 1).

After cooling the light source housing 97 and the exterior cover 59, air flowing between the light source housing 97 and the exterior cover 59 from the opening portion 96a of the light source duct 96 is discharged from the exhaust duct 85 by the exhaust fan 86.

Furthermore, after flowing into the light source 61 and cooling the light source 61, the air flowing into the light source air supply port 64b is discharged from the light source exhaust duct 64c provided on the upper surface of the holder 64. Air discharged from the light source exhaust duct 64c is discharged to the space surrounded by the power supply unit 80 from the opening of the upper surface of the light source housing 97. Thereafter, the discharged air is mixed with low-temperature air flowing into the space surrounded by the power supply unit 80 from the intake duct 84, and then is discharged from the exhaust duct 85 by the exhaust fan 86. Thus, by exhausting the high-temperature air exhausted from the light source exhaust duct 64c after mixing with the outside air, it is possible to suppress the air exhausted from the exhaust duct 85 from becoming a high temperature.

In addition, it is preferred that the operation unit 83 operated by a user be provided on the upper surface of the apparatus so as to be easily operated by a user. However, in the present embodiment, since a dust-proof glass 51 for projecting an image onto the projection plane 2 is provided on the upper surface of the projector 1, it is preferable to provide the operation unit 83 at a position overlapping the light source 61 when the projector is viewed from the Y-direction.

In the present embodiment, since air becoming a high temperature by cooling the light source 61 is exhausted toward the exhaust duct 85, by the air flow flowing toward the exhaust duct 85 from the intake duct 84 between the light source unit 60 and the operating unit 83, the high-temperature air is suppressed from moving to the operation unit 83. This suppresses the temperature of the operation unit 83 from increasing due to air becoming the high temperature by cooling the light source 61. Furthermore, a part of air going around the second projection optical system 40 from the intake duct 84 and flowing toward the exhaust duct 85 passes through the right under the operation unit 83 to cool the operation unit 83. This can also suppress the temperature increase of the operation unit 83.

On the left lower side of FIG. 14 of the apparatus main body, a cooling unit 120 that cools the heat sink 13 of the light modulator 10, the light source bracket 62 of the light source unit 60 or the like is disposed. The cooling unit 120 has an intake blower 91, and a horizontal duct 93.

Figure 27:
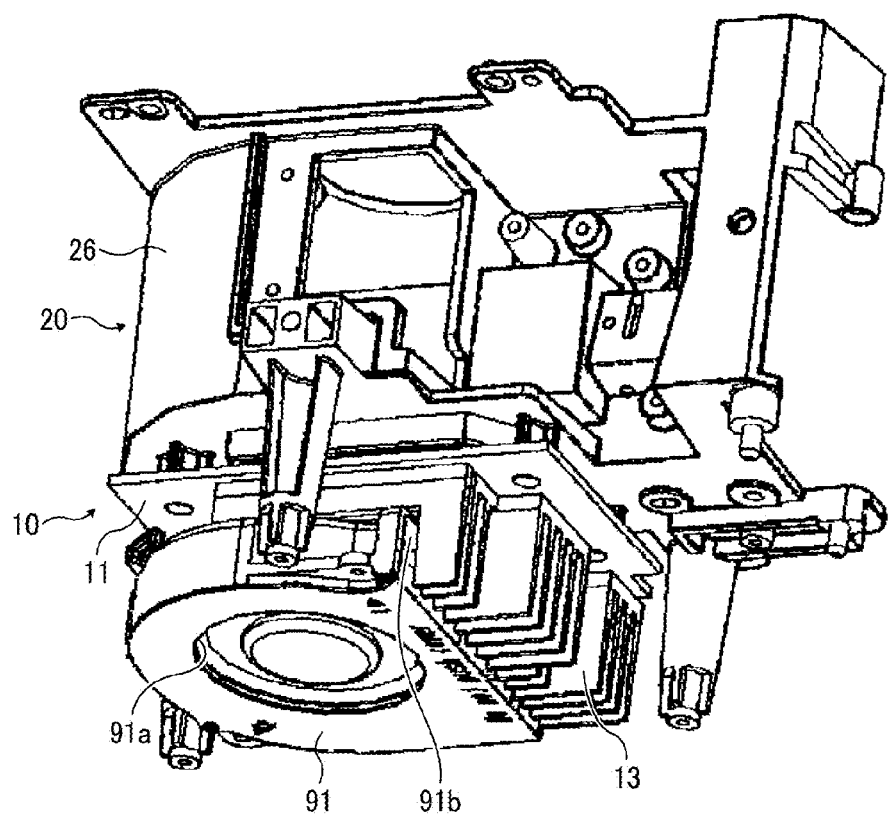
FIG. 27 is a perspective view illustrating a light modulation unit, the illumination unit, and an intake blower according to an embodiment of the present invention.

As illustrated in FIG. 27, the intake blower 91 is a double-sided suction sirocco fan. The intake blower 91 is attached to the light modulator 10 so that a base member side blower intake duct 91a of the intake blower 91 faces the first intake duct 92 provided in the base member 53 as a facing surface portion that faces the DMD 12 of the housing of the projector. In addition, the opposite surface of the base member side blower intake duct 91a of the intake blower 91 is also the intake duct, but the base member side blower intake duct 91a has a higher intake amount. The heat sink 13 is formed by a first fin portion having a predetermined fin height, and a second fin portion having a higher fin height than the first fin portion. The intake blower 91 is attached to the first fin portion so that a blower exhaust duct 91b of the intake blower 91 faces the second fin portion of the heat sink 13. By using the intake blower 91 as a double-sided suction sirocco fan, it is possible to efficiently cool the first fin of the heat sink 13.

As illustrated in FIG. 14, the horizontal duct 93 is fixed to the base member 53 of the projector 1 so that a part of the upper and lower surfaces thereof is opened, and the opening portion of the lower surface faces the DMD cooling intake duct 92 provided on the base member 53. Furthermore, the light modulator 10 is disposed on the horizontal duct 93 so that the heat sink 13 of the light modulator 10 and the intake blower 91 attached to the light modulator 10 go through the opening portion of the horizontal duct upper surface.

The intake blower 91 sucks the outside air by the base member side blower intake duct 91a via the DMD cooling intake duct 92, and exhausts the outside air toward the second fin portion of the heat sink 13 from the blower exhaust duct 91b. Thus, the second fin portion of the heat sink 13 is air-cooled. It is possible to efficiently cool the DMD 12 by the second fin portion of the heat sink 13 being air-cooled, thereby suppressing the DMD 12 from becoming a high temperature.

As illustrated in FIG. 14, the flow is generated by the intake blower 91, and the air passed through the heat sink 13 moves through the horizontal duct 93 and flows into the passage portion 65 or the opening portion 65a provided in the light source bracket 62 of the light source unit 60 illustrated in FIG. 5. Air flowing into the opening portion 65a flows between an opening and closing the cover 54 and the light source bracket 62 to cool the opening and closing cover 54.

Meanwhile, air flowing into the passage portion 65 flows into the portion on the opposite side to the emission side of the light source 61 after cooling the light source bracket 62, and cools the side opposite to the reflection surface of the reflector of the light source 61, thereby cooling the reflector of the light source 61. Thus, air passing through the passage portion 65 absorbs heat of both the bracket 62 and the light source 61. After passing through the exhaust duct 94 that guides air from the height of the light source bracket 62 to the height of the vicinity of the bottom of the exhaust fan 86, the air passed through the vicinity of the reflector joins the air exhausted from the light source exhaust duct 64C, and is discharged from the exhaust duct 85 by the exhaust fan 86. Furthermore, after cooling the opening and closing cover 54, air flowing between the opening and closing cover 54 and the light source bracket 62 through the opening portion 65a moves through the apparatus, and is discharged from the exhaust duct 85 by the exhaust fan 86.

In the present embodiment, a DMD cooling intake duct 92 is provided in the base member 53 as a facing surface portion that faces the DMD 12 of the housing of the projector. As a result, the outside air sucked from the DMD cooling intake duct 92 directly flows into the DMD 12. Therefore, it is possible to cool the DMD 12 without being warmed by heat of the apparatus, compared to a case where the outside air flows into the DMD 12 via the duct.

Furthermore, in the present embodiment, as described above, since the aperture ratio is increased by narrowing the width of the grid of the intake cover 84a, the air outside the apparatus is easily taken from the intake duct 84. Furthermore, the pressure loss of the air passing through the grid except for the thick reinforcing grid portion 285 is less than the pressure loss of the air passing through the reinforcing grid portion 285. Thus, it is possible to increase air taken from the intake cover 84*a*, while suppressing the strength reduction of the intake cover, as compared to a case where the entire intake cover 84*a* is thick. Thus, it is possible to increase the air outside the apparatus taken from the intake duct 84, thereby sufficiently cooling the power supply unit 80, without increasing the rotational speed of the exhaust fan 86. As a result, it is also possible to suppress noise due to wind noise of the exhaust fan 86.

Figure 28:
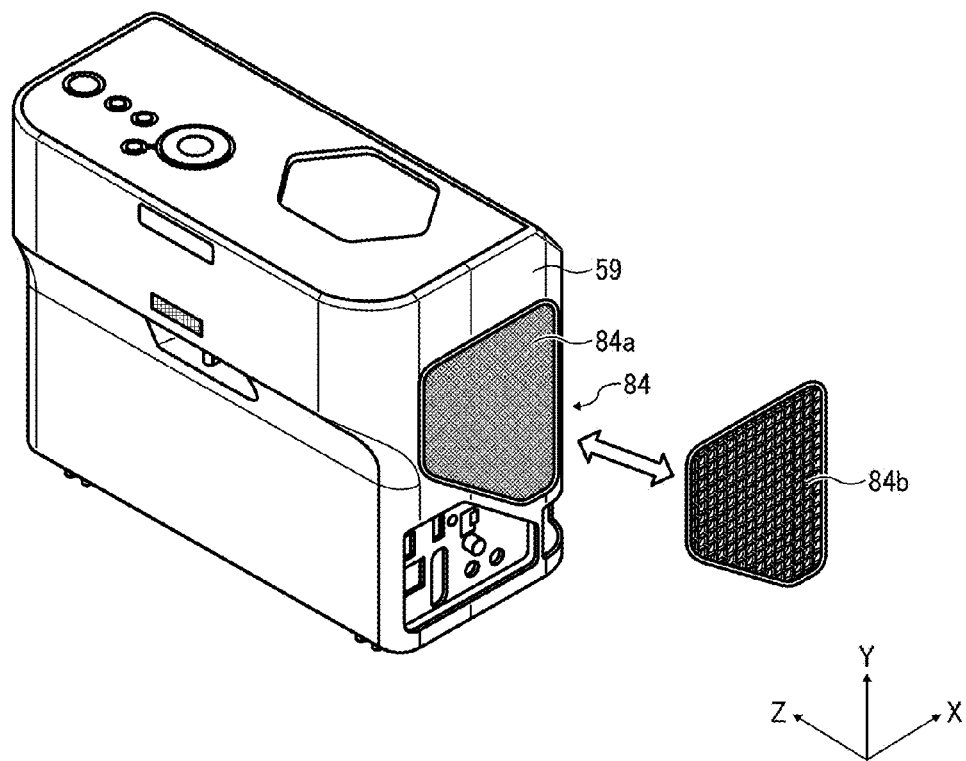
FIG. 28 is a perspective view illustrating an embodiment in which two intake covers are provided in the intake duct.

Furthermore, as illustrated in FIG. 28, two intake covers 84*a* and 84*b* may be provided in the intake duct 84. In this case, a dust-proof filter (not illustrated) is provided between the second intake cover 84*b* disposed on the outer side and the inner intake cover 84*a*, and is held by the intake cover 84*a* and the second intake cover 84*b*. By providing the dust-proof filter, the outside air taken from the intake duct 84 flows into the machine through the dust-proof filter. Therefore, the air outside the apparatus flowing into the machine from the intake duct 84 hardly contains dust and dirt. Thus, even when a part of the air outside the apparatus taken from the intake duct 84 flows into the second projection optical system 40 from a gap between the lower surface of the curved mirror 42 and the lens holder 32, it is possible to suppress dust and dirt from adhering to the curved mirror 42 and the reflecting mirror 41. With this configuration, the high-quality projection image can be projected onto the projection plane 2 over time. Furthermore, by detaching the second intake cover 84*b*, the dust-proof filter is easily detachable, thereby easily performing the cleaning of the dust-proof filter.

When providing the dust-proof filter, since the dust-proof filter prevents the flow of air, there is a risk of a decrease in the intake amount. However, in the present embodiment, as described above, the reinforcing grid portion 285 is provided to ensure the strength of the intake cover, and the grid width of the intake cover 84*a* is narrowed to increase the aperture ratio. Therefore, it is possible to suppress a decrease in an intake amount, as compared to a case of using the conventional intake cover having the narrow grid width so as to ensure the strength of the intake cover 84*a*. Furthermore, even if the second intake cover 84*b* is damaged, as long as the inner intake cover 84*a* is not damaged, the user is not most likely to insert a finger or the like into the apparatus. Therefore, the second intake cover 84*b* does not require much strength. Therefore, it is preferred that the second intake cover 84*b* be configured to take a lot of air by narrowing the width of the grid to increase the aperture ratio.

Figure 29:
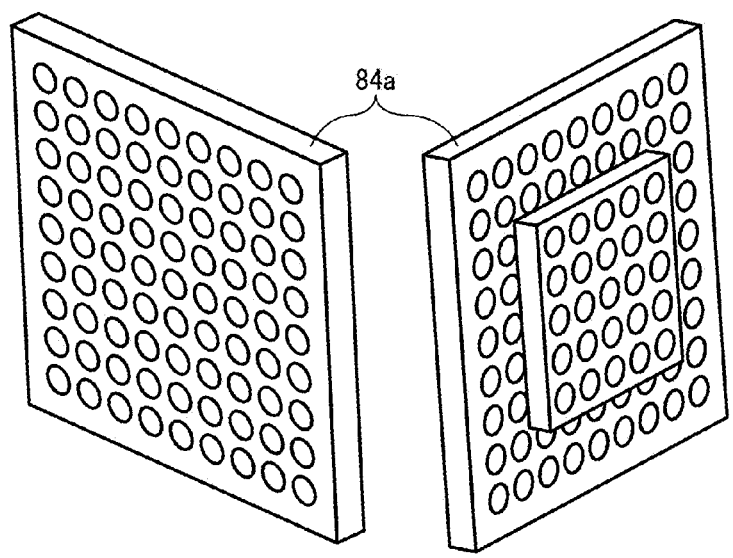
FIG. 29 is a perspective view illustrating an intake cover of a modified example.

In the above description, the intake cover is assumed to have the rectangular opening. Alternatively, as illustrated in FIG. 29, the shape of opening is not limited to a rectangular, such that the aperture shape of the grid of a circular shape may be applicable.

Further, in alternative to applying the above-described configuration of the intake cover 84*a* to the intake cover 84*a*, the above-described configuration may be applied to the exhaust cover 85*a* provided in the exhaust duct 85.

An image projection apparatus such as a projector 1 is provided with a housing, such as the exterior cover 59 provided with a grid portion such as the intake cover 84*a*. Through the intake cover 84*a*, air flows into or out from the apparatus. The intake cover 84*a* includes a central portion having a thickness thicker than that of an edge portion periphery of the intake cover 84*a*. The central portion not only includes a center, but the other portion of the intake cover 84*a* close to the center.

As described in the above-described verification test, by setting the thickness of the portion including the central portion of the grid portion to be thicker than the thickness of the edge portion periphery of the grid portion, it is possible to increase the strength as compared to the conventional thin grid portion (intake cover 184*a* of the first comparative example). Furthermore, since the vicinity of the edge portion of the grid portion is connected to the housing, the vicinity has the higher strength compared to the central portion of the grid portion. Therefore, by thickening the portion including the central portion of the grid portion with the low strength, it is possible to effectively improve the strength of the grid portion. Thus, even if the grid width is narrowed to increase the aperture ratio, it is possible to maintain a predetermined strength, and to increase the aperture ratio of the grid portion, while maintaining the strength of the grid portion.

Furthermore, since the vicinity of the edge portion of the grid portion can be thin, it is possible to reduce the material costs and to suppress an increase in cost of the apparatus, as compared to a case where the entire grid portion is thick.

Furthermore, the member of the apparatus disposed opposite to the edge portion periphery of the grid portion thinner than the central portion can be disposed closer to the grid portion than the central portion. As a result, it is possible to suppress enlargement of the apparatus as compared to the case where the thickness of the entire grid portion is thickened. Furthermore, it is possible to suppress the pressure loss of air passing through the opening of the grid around the edge portion of the grid portion, as compared to the thick central portion. Thus, it is possible to suppress the pressure loss of the air as compared to a case where the entire grid portion is thick, and it is possible to take or exhaust an increased amount of air. This allows to take or exhaust the increased amount of air, without increasing the rotational speed of the fan, and it is possible to efficiently air-cool the heat source such as the light source and the power supply in the apparatus.

In one example, the components inside the apparatus and the grid portion come into contact with each other within the range of elastic deformation of the grid portion. For example, when impact is applied to the grid portion and the grid portion is elastically deformed to the inside of the apparatus, the grid portion comes into contact with the components inside the apparatus. Thus, the apparatus has a shape in such a manner that the grid portion is supported by the components of the apparatus, and thus, the impact is absorbed. As a result, it is possible to further prevent damage to the grid portion.

In one example, the portion including the central portion of the grid portion comes into contact with the components of the apparatus. Since the portion including the central portion of the grid portion is supported by the apparatus internal components, it is possible to sufficiently absorb the impact.

In one example, the grid portion is formed by superimposing the grid members such as two intake covers and attaching to the opening of the housing.

With this configuration, it becomes possible to hold the dust-proof filter between two intake covers. Furthermore, by simply detaching the grid member such as the intake cover disposed on the outer side, it is possible to detach the dust-proof filter, thereby easily performing cleaning or replacement of the dust-proof filter.

In the two grid members, the thickness of the portion including the central portion of the grid member disposed on the inner side is thicker than the thickness of the edge portion periphery of the grid member.

In another example, the thick portion of the grid may be provided, such as the reinforcing grid portion 285 provided on the inner side of the apparatus.

What is claimed is:

1. An image projection apparatus comprising:
   a housing;
   a removable ventilation cover, the ventilation cover having a grid portion provided on the housing of the apparatus, and including a plurality of grids through which air flows in or out of the apparatus, the grid portion including:
      a solid rim portion having a sidewall of a first height and a first thickness in an air intake direction and having a plurality of first grids extending in two directions that are perpendicular to each other; and
      a central portion having a sidewall of a second height extending from an upper surface of the first grids, the central portion including a plurality of second grids extending in two directions that are perpendicular to each other, the central portion being surrounded by the rim portion and including a second thickness in the air intake direction, the second thickness being thicker than the first thickness of the rim portion of the grid portion, and the plurality of second grids in the central portion are thicker than the plurality of first grids in the rim portion in the air intake direction, wherein an area of only the central portion of the grid portion having the second thickness is set from one-fifth (⅕) to one-half (½) of the total area of the grid portion.

2. The image projection apparatus according to claim 1, wherein the grid portion directly contacts a component inside the housing of the apparatus within a range of elastic deformation of the grid portion.

3. The image projection apparatus according to claim 2, wherein the central portion of the grid portion directly contacts the component inside the housing of the apparatus.

4. The image projection apparatus according to claim 2, wherein the component inside the housing of the apparatus is configured as a projection optical unit to project light flux of an image, generated by using light coming from a light source, onto a projection face.

5. The image projection apparatus according to claim 2, wherein the grid portion includes two grid members, which are superimposed one above the other to cover opening of the housing.

6. The image projection apparatus according to claim 5, wherein one of the two grid members that is disposed on the inner side includes:
   the rim portion of the grid member; and
   a central portion of the grid member, having the second thickness thicker than the first thickness of the rim portion of the grid member.

7. The image projection apparatus according to claim 1, wherein the grid portion includes two separate grid members, which are superimposed in parallel one above the other to cover opening of the housing.

8. The image projection apparatus according to claim 7, wherein one of the two grid members that is disposed on the inner side includes:
   the rim portion; and
   the central portion, having the second thickness thicker than the first thickness of the rim portion of the grid member.

9. The image projection apparatus according to claim 3, wherein the component inside the housing of the apparatus is configured as a projection optical unit to project light flux of an image, generated by using light coming from a light source, onto a projection face.

10. The image projection apparatus according to claim 3, wherein the grid portion includes two grid members, which are superimposed one above the other to cover opening of the housing.

11. The image projection apparatus according to claim 10, wherein one of the two grid members that is disposed on the inner side includes:
   the rim portion of the grid member; and
   a central portion of the grid member, having the second thickness thicker than the first thickness of the rim portion of the grid member.

12. The image projection apparatus according to claim 1, wherein the central portion increases in thickness from the periphery of the grid portion toward an apex of the central portion.

13. The image projection apparatus according to claim 1, wherein the sidewall of the rim portion surrounds the first grids and the sidewall of the central portion surrounds the second grids.

14. An image projection apparatus comprising:
   a removable ventilation cover having a grid portion provided on a housing of the apparatus and including a plurality of grids though which air flows in or out of the apparatus, the grid portion including:
   a first grid member and a second grid member (two grid members) overlaid one to another, at an opening of the housing,
   the first grid member disposed at an inner side and the second grid member disposed at an outer side,
   the first grid member including:
      a solid rim portion having a sidewall of a first height and includes at least some of the plurality of grids, the rim portion having a first thickness in an air intake direction and having a plurality of first grids extending in two directions that are perpendicular to each other; and
      a central portion having a sidewall of a second height extending from an upper surface of the first grids and that includes a plurality of second grids extending in two directions that are perpendicular to each other, the central portion being surrounded by the rim portion and having a second thickness in the air intake direction relatively thicker than the first thickness of the rim portion, and the plurality of second grids in the central portion are thicker that the plurality of first grids in the rim portion in the air intake direction, wherein an area of only the central portion of the grid portion having the second thickness is set from one-fifth (⅕) to one-half (½) of the total area of the grid portion.

15. The image projection apparatus according to claim 14, wherein the second grid member includes:
   a rim portion having at least some of the plurality of grids; and
   a central portion that includes at least some of the plurality of grids.

16. The image projection apparatus according to claim 14, wherein the sidewall of the rim portion surrounds the first grids and the sidewall of the central portion surrounds the second grids.

* * * * *